US009783952B2

(12) United States Patent
Nagato et al.

(10) Patent No.: US 9,783,952 B2
(45) **Date of Patent: *Oct. 10, 2017**

(54) WORKING MACHINE AND METHOD OF MEASURING WORK AMOUNT OF WORKING MACHINE

(71) Applicant: Komatsu Ltd., Tokyo (JP)

(72) Inventors: Atsushi Nagato, Fujisawa (JP); Masamichi Ueda, Tokyo (JP)

(73) Assignee: Komatsu Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/438,980

(22) PCT Filed: Nov. 12, 2013

(86) PCT No.: PCT/JP2013/080603
§ 371 (c)(1),
(2) Date: Apr. 28, 2015

(87) PCT Pub. No.: WO2014/080805
PCT Pub. Date: May 30, 2014

(65) Prior Publication Data

US 2015/0292178 A1 Oct. 15, 2015

(30) Foreign Application Priority Data

Nov. 20, 2012 (JP) ................................ 2012-254694

(51) Int. Cl.
*G06F 7/70* (2006.01)
*G06F 19/00* (2011.01)
(Continued)

(52) U.S. Cl.
CPC ............ *E02F 3/435* (2013.01); *E02F 9/2285* (2013.01); *E02F 9/2292* (2013.01);
(Continued)

(58) Field of Classification Search
CPC ... E02F 9/2225; E02F 3/32; E02F 3/34; E02F 9/18; E02F 3/40; E02F 3/58; E02F 5/32;
(Continued)

(56) References Cited

U.S. PATENT DOCUMENTS 4,035,621 A * 7/1977 Kemp .................. G07C 5/0883 37/348
5,257,177 A * 10/1993 Bach ..................... B66C 13/066 340/685
(Continued)

FOREIGN PATENT DOCUMENTS

CN 1571872 A 1/2005
CN 1938485 A 3/2007
(Continued)

OTHER PUBLICATIONS

International Search Report dated Feb. 18, 2014, issued for PCT/JP2013/080603.

*Primary Examiner* — Jelani Smith
*Assistant Examiner* — Luis A Martinez Borrero
(74) *Attorney, Agent, or Firm* — Locke Lord LLP

(57) ABSTRACT

A working machine includes: an operation state detection unit configured to detect a physical amount output according to an operation of an operation lever; a time integration unit configured to calculate a time integration value by performing time integration of the physical amount; a determination unit configured to cause the time integration value and a predetermined operating angle of an excavating and loading mechanism associated with the operation of the operation lever to correspond to each other, and to determine that the operation of the operation lever has been performed at a time the time integration value becomes a predetermined integration value or more; and a counting unit configured to count at a time operations of the excavating and loading
(Continued)

mechanism determined by the determination unit are performed in a predetermined order, number of times of excavating and loading work.

9 Claims, 13 Drawing Sheets

(51) Int. Cl.

| | |
|---|---|
| ***G06G 7/00*** | (2006.01) |
| ***G06G 7/76*** | (2006.01) |
| ***E02F 3/43*** | (2006.01) |
| ***E02F 9/22*** | (2006.01) |
| ***E02F 9/26*** | (2006.01) |
| ***G07C 5/08*** | (2006.01) |

(52) U.S. Cl.

CPC .............. *E02F 9/2296* (2013.01); *E02F 9/26* (2013.01); *G07C 5/0816* (2013.01); *G07C 5/0841* (2013.01)

(58) Field of Classification Search

CPC ......... E02F 9/261; E02F 9/207; E02F 9/2025; E02F 9/2292; E02F 9/2045; E02F 9/2246; E02F 9/2058; E02F 3/3417; E02F 9/2217; E02F 9/26; E02F 9/2079; E02F 9/2029; E02F 9/2095; G07C 5/085; G07C 5/02; G07C 5/0841; G07C 3/08; G07C 5/0808; G07C 5/0816; G07C 5/10; A01D 41/1272; A01D 41/1276; A01D 41/1275; A01D 41/1277; A01D 2085/008

USPC ..... 701/50, 22, 103, 29.1, 32.3, 500, 84, 96, 701/2, 23, 33.9, 32.7, 400, 408, 41, 48, 701/110, 124, 102, 111, 54, 87

See application file for complete search history.

(56) References Cited

U.S. PATENT DOCUMENTS

| | | | | | |
|---|---|---|---|---|---|
| 5,308,219 | A * | 5/1994 | Lee | E02F 3/435 | 414/695.5 |
| 5,446,980 | A * | 9/1995 | Rocke | E02F 3/439 | 37/348 |
| 5,924,493 | A * | 7/1999 | Hartman | E02F 3/431 | 172/4.5 |
| 5,999,872 | A * | 12/1999 | Kinugawa | E02F 9/2025 | 172/2 |
| 6,079,131 | A * | 6/2000 | Oshina | E02F 3/435 | 318/568.11 |
| 6,167,336 | A * | 12/2000 | Singh | E02F 3/434 | 172/2 |
| 6,728,619 | B2 * | 4/2004 | Adachi | E02F 9/26 | 342/357.75 |
| 6,931,772 | B2 | 8/2005 | Furuno et al. | | |
| 7,395,184 | B2 * | 7/2008 | Takeda | B60G 5/00 | 177/136 |
| 7,659,677 | B2 | 2/2010 | Yoshimatsu et al. | | |
| 7,894,961 | B2 * | 2/2011 | Blackburn | G07C 5/085 | 180/271 |
| 8,014,974 | B2 * | 9/2011 | Doddek | G05B 23/0235 | 702/183 |
| 8,103,418 | B2 * | 1/2012 | Osswald | B62D 21/14 | 187/224 |
| 8,509,999 | B2 * | 8/2013 | Suzuki | E02F 9/24 | 701/50 |
| 8,775,033 | B2 * | 7/2014 | Magaki | E02F 9/2075 | 180/65.26 |
| 8,798,872 | B2 | 8/2014 | Kagoshima et al. | | |
| 9,013,289 | B2 | 4/2015 | Nishikawa et al. | | |
| 9,303,390 | B2 * | 4/2016 | Nagato | E02F 3/435 | |
| 9,304,501 | B2 * | 4/2016 | Danko | B25J 9/1628 | |
| 9,469,972 | B2 * | 10/2016 | Ge | E02F 9/2246 | |
| 2003/0023325 | A1 * | 1/2003 | Adachi | E02F 9/26 | 700/9 |
| 2009/0038186 | A1 * | 2/2009 | Osswald | B62D 21/14 | 37/413 |
| 2010/0245542 | A1 * | 9/2010 | Kim | G01B 11/00 | 348/46 |
| 2011/0010059 | A1 * | 1/2011 | Suzuki | E02F 9/24 | 701/50 |
| 2012/0089288 | A1 * | 4/2012 | Kawashima | B60K 6/485 | 701/22 |
| 2012/0315119 | A1 * | 12/2012 | Magaki | E02F 9/2075 | 414/685 |
| 2013/0041561 | A1 * | 2/2013 | Asami | E02F 9/2246 | 701/50 |
| 2013/0213026 | A1 * | 8/2013 | Yamamoto | B66C 23/86 | 60/327 |
| 2013/0325268 | A1 * | 12/2013 | Ishihara | E02F 9/2246 | 701/50 |
| 2013/0332036 | A1 * | 12/2013 | Yamamoto | E02F 9/123 | 701/50 |
| 2015/0006010 | A1 * | 1/2015 | Ito | E02F 9/2075 | 701/22 |
| 2015/0240458 | A1 * | 8/2015 | Nagato | E02F 3/435 | 701/32.7 |
| 2015/0292185 | A1 * | 10/2015 | Nagato | E02F 3/435 | 701/33.9 |
| 2015/0299989 | A1 * | 10/2015 | Nagato | E02F 3/435 | 701/34.4 |

FOREIGN PATENT DOCUMENTS

| | | | |
|---|---|---|---|
| CN | 101153496 | A | 4/2008 |
| CN | 102224304 | A | 10/2011 |
| JP | 02-016417 | B2 | 4/1990 |
| JP | 11-140910 | A | 5/1999 |
| JP | 2000-129727 | A | 5/2000 |
| JP | 2011-094453 | A | 5/2011 |
| JP | 2012-225004 | A | 11/2012 |

* cited by examiner

WORKING MACHINE AND METHOD OF MEASURING WORK AMOUNT OF WORKING MACHINE

FIELD

The present invention relates to a working machine and a method of measuring a work amount of a working machine that can easily and highly accurately measure the number of times of a series of operations of an excavating and loading mechanism, the operations being performed at the time of excavating and loading work, or the like.

BACKGROUND

When a working machine such as an excavator operated on a work site of civil engineering work performs work to excavate soil and load the soil on a transportation vehicle such as a dump truck (hereinafter, excavating and loading work), a person who performs work management of progress of construction on the work site, and the like needs to manage output of a work amount by everyday excavating and loading work, progress of the excavating and loading work, and work efficiency of the excavating and loading work. Manual measurement of the work amount of the excavating and loading work and the like which are performed by the working machine such as an excavator places a burden on an operator and is also troublesome, and thus automatization of the measurement has been proposed.

For example, Patent Literature 1 describes one that detects operation signals and operation times of an actuator of a construction machine, compares the operation signals and the operation times, and a plurality of conditions stored in advance, when the operation signal and the operation time that accord with a plurality of conditions have been detected, extracts the according conditions, and counts the number of times of loading work, based on extracted values.

CITATION LIST

Patent Literature

Patent Literature 1: Japanese Laid-open Patent Publication No. 2000-129727

SUMMARY

Technical Problem

However, Patent Literature 1 requires a complicated condition weighting processing program and work determination processing program. Further, for example, to highly accurately measure the number of times of a series of operations of a working device and an upper swing body, such as excavating and loading work in which excavation, forward swing, soil removal, and return swing are repeatedly performed in order among vehicle size classes of excavators having different sizes and the like, it is necessary to perform different setting among the vehicle size classes. Therefore, the work amount measuring device disclosed in Patent Literature 1 lacks versatility.

The present invention has been made in view of the foregoing, and an objective is to provide a working machine and a method of measuring a work amount of a working machine that can easily and highly accurately measure the number of times of a series of operations of an excavating and loading mechanism, which is performed in excavating and loading work.

Solution to Problem

To solve the above-described problem and achieve the object, a working machine according to the present invention includes: an operation state detection unit configured to detect a physical amount output according to an operation of an operation lever; a time integration unit configured to calculate a time integration value by performing time integration of the physical amount; a determination unit configured to cause the time integration value and a predetermined operating angle of an excavating and loading mechanism associated with the operation of the operation lever to correspond to each other, and to determine that the operation of the operation lever has been performed at a time the time integration value becomes a predetermined integration value or more; and a counting unit configured to count at a time operations of the excavating and loading mechanism determined by the determination unit are performed in a predetermined order, number of times of excavating and loading work, treating the operations of the excavating and loading mechanism performed in the predetermined order, as one time.

Moreover, in the above-described working machine according to the present invention, the operations of the excavating and loading mechanism are excavating and loading operations performed in an order of an excavation operation, a forward swing operation, a soil removal operation, and a return swing operation.

Moreover, in the above-described working machine according to the present invention, the determination unit is configured to determine that the excavation operation has been performed at a time the time integration value is the predetermined integration value or more, and the physical amount is an operation termination predetermined value or less in order to determine the excavation operation.

Moreover, in the above-described working machine according to the present invention, the determination unit is configured to determine that the excavation operation has been performed at a time the time integration value is the predetermined integration value or more, and a predetermined time has passed after the physical amount becomes the operation termination predetermined value or less in order to determine the excavation operation.

Moreover, in the above-described working machine according to the present invention, the time integration unit is configured to reset the time integration value at a time a state where the physical amount is an integration start value or less has passed for a time integration value hold time after start of time integration in order to determine the excavation operation or the oil removal operation.

Moreover, in the above-described working machine according to the present invention, the operation lever is a pilot control lever or an electric lever, and the physical amount is a pilot pressure or an electrical signal.

Moreover, in the above-described invention, the working machine according to the present invention includes an output unit configured to output the number of times of the excavating and loading work counted by the counting unit to a display device or an outside.

Moreover, in the above-described invention, the working machine according to the present invention includes a setting change unit configured to change various setting values.

Moreover, a method of measuring a work amount of a working machine according to the present invention includes the steps of: detecting a physical amount output according to an operation of an operation lever; calculating a time integration value by performing time integration of the physical amount; causing the time integration value and a predetermined operating angle of an excavating and loading mechanism associated with the operation of the operation lever to correspond to each other, and to determine that the operation of the operation lever has been performed, when the time integration value becomes a predetermined integration value or more; and counting, when operations of the excavating and loading mechanism determined by the determining step are performed in a predetermined order, number of times of excavating and loading work, treating the operations of the excavating and loading mechanism performed in the predetermined order, as one time.

According to the invention, a physical amount output according to an operation of an operation lever is detected, a time integration value that is the time-integrated physical value is calculated, the time integration value and a predetermined operating angle of an excavating and loading mechanism associated with the operation of the lever are caused to correspond to each other and it is determined that the operation of the operation lever has been performed when the time integration value becomes a predetermined integration value or more, and when the determined operations of the excavating and loading mechanism are performed in a predetermined order, the number of times of operations of the excavating and loading mechanism is counted, where the operations of the excavating and loading mechanism performed in the predetermined order are treated as one time. Therefore, the number of times of a series of operations of the excavating and loading mechanism, which is performed in excavating and loading work, can be easily and highly accurately measured.

DESCRIPTION OF EMBODIMENTS

Hereinafter, embodiments for implementing the present invention will be described with reference to the appended drawings.

Overall Configuration

Figure 1:
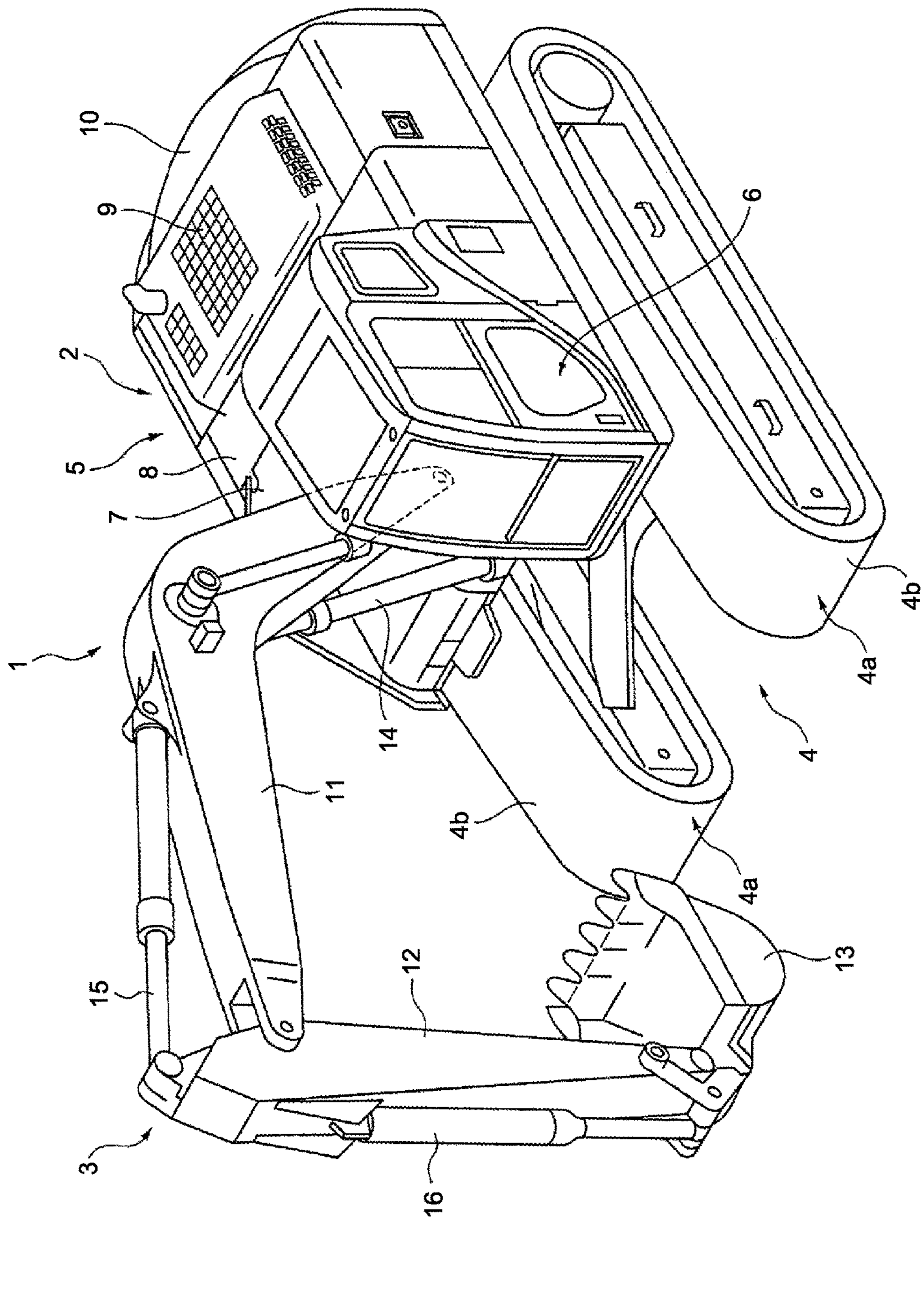
FIG. 1 is a perspective view illustrating a schematic configuration of an excavator of an embodiment.
Figure 2:
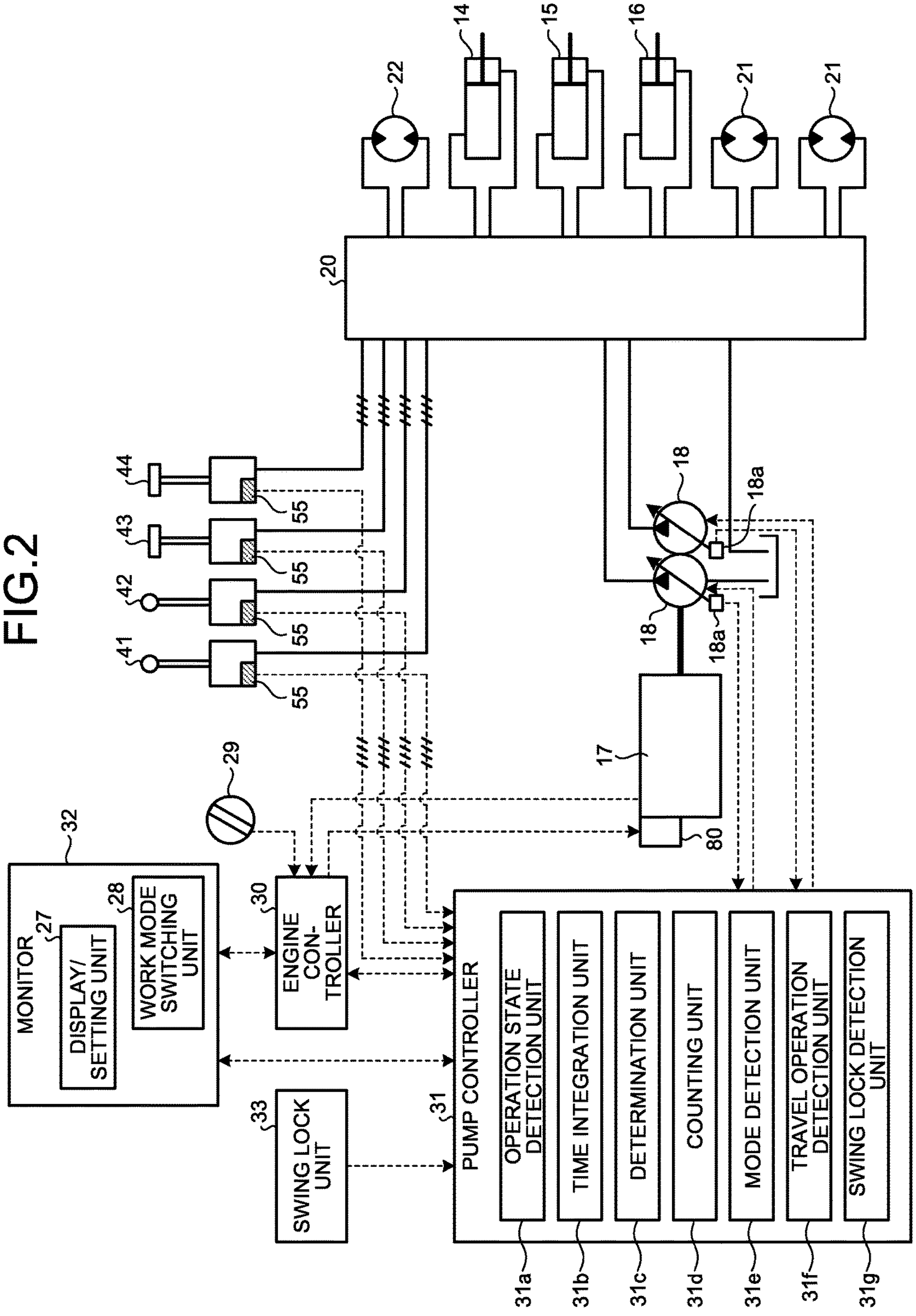
FIG. 2 is a block diagram illustrating a configuration of the excavator illustrated in FIG. 1.

First, FIGS. 1 and 2 illustrate an overall configuration of an excavator 1 that is an example of a working machine. The excavator 1 includes a vehicle body 2 and a working device 3. The vehicle body 2 includes a lower traveling body 4 and an upper swing body 5. The lower traveling body 4 includes a pair of traveling devices 4*a*. The traveling devices 4*a* include crawler belts 4*b*, respectively. The traveling devices 4*a* cause the excavator 1 to travel or swing by driving the crawler belts 4*b* by a right hydraulic travel motor and a left hydraulic travel motor (hydraulic travel motors 21).

The upper swing body 5 is swingably provided on the lower traveling body 4, and swings as a swing hydraulic motor 22 is driven. Further, an operator's cab 6 is provided in the upper swing body 5. The upper swing body 5 includes a fuel tank 7, a hydraulic oil tank 8, an engine room 9, and a counter weight 10. The fuel tank 7 stores fuel for driving an engine 17. The hydraulic oil tank 8 stores hydraulic oils discharged from hydraulic pumps 18 to hydraulic cylinders such as a boom cylinder 14 and hydraulic equipment such as the swing hydraulic motor 22 and the hydraulic travel motors 21. The engine room 9 houses devices such as the engine 17 and the hydraulic pumps 18. The counter weight 10 is arranged behind the engine room 9.

The working device 3 is attached to a central position of a front part of the upper swing body 5, and includes a boom 11, an arm 12, a bucket 13, a boom cylinder 14, an arm cylinder 15, and a bucket cylinder 16. A base end portion of the boom 11 is revolvably coupled with the upper swing body 5. Further, a tip portion of the boom 11 is revolvably coupled with a base end portion of the arm 12. A tip portion of the arm 12 is revolvably coupled with the bucket 13. The boom cylinder 14, the arm cylinder 15, and the bucket cylinder 16 are hydraulic cylinders driven by the hydraulic oil discharged from the hydraulic pump 18. The boom cylinder 14 operates the boom 11. The arm cylinder 15 operates the arm 12. The bucket cylinder 16 is coupled with the bucket 13 through a link member, and can operate the bucket 13. A cylinder rod of the bucket cylinder 16 performs an extension/contraction operation, so that the bucket 13 is operated. That is, when the soil is excavated and scooped up with the bucket 13, the cylinder rod of the bucket cylinder 16 is extended, and the bucket 13 is operated revolving from the front to the rear of the excavator 1. Then, when the scooped soil is discharged, the cylinder rod of the bucket cylinder 16 is contracted, and the bucket 13 is operated revolving from the rear to the front of the excavator 1.

In FIG. 2, the excavator 1 includes the engine 17 as a drive source, and the hydraulic pumps 18. A diesel engine is used as the engine 17, and variable displacement hydraulic pumps (for example, swash plate-type hydraulic pumps) are used as the hydraulic pumps 18. The hydraulic pumps 18 are mechanically coupled with an output shaft of the engine 17. The engine 17 is driven, so that the hydraulic pumps 18 are driven.

The hydraulic driving system drives the boom cylinder 14, the arm cylinder 15, the bucket cylinder 16, and the swing hydraulic motor 22 according to operations of operation levers 41 and 42 provided in the operator's cab 6 provided in the vehicle body 2. Further, the hydraulic driving system drives the hydraulic travel motor 21 according to operations of travel levers 43 and 44. The operation levers 41 and 42 is arranged at the right and left of an operator seat (not illustrated) in the operator's cab 6, and the travel levers 43 and 44 are arranged in front of the operator seat side by side. The operation levers 41 and 42 and the travel levers 43 and 44 are pilot control levers, and a pilot pressure is generated according to an operation of each lever. The magnitude of the pilot pressures of the operation levers 41 and 42 and the travel levers 43 and 44 is detected by pressure sensors 55, and output voltages according to the magnitude of the pilot pressures are output as electrical signals. The electrical signals that correspond to the pilot pressures detected by the pressure sensors 55 are sent to a pump controller 31. The pilot pressures from the operation levers 41 and 42 are input to a control valve 20, and control an opening of a main valve that connects the hydraulic pump 18, and the boom cylinder 14, the arm cylinder 15, the bucket cylinder 16, and the swing hydraulic motor 22, in the control valve 20. Meanwhile, the pilot pressures from the travel levers 43 and 44 are input to the control valve 20, and control an opening of a main valve that connects the corresponding hydraulic travel motors 21 and the hydraulic pump 18.

A fuel adjustment dial 29, a monitor 32, and swing lock unit 33 are provided in the operator's cab 6. These units are in the vicinity of the operator seat in the operator's cab 6, and are arranged at positions where the operator can easily operate these units. The fuel adjustment dial 29 is a dial (setting unit) for setting a supply amount of fuel to the engine 17. A setting value of the fuel adjustment dial 29 is converted into an electrical signal and is output to an engine controller 30. Note that the supply amount of fuel may be able to be set by incorporating the fuel adjustment dial 29 in a display/setting unit 27 of the monitor 32, and operating the display/setting unit 27. The monitor 32 is a display device and includes the display/setting unit 27 that performs various types of display and setting. Further, the monitor 32 includes a work mode switching unit 28. The display/setting unit 27 and the work mode switching unit 28 are configured from a liquid crystal panel and a switch, for example. The display/setting unit 27 and the work mode switching unit 28 may be configured as touch panels. Work modes switched by the work mode switching unit 28 include a P mode (power mode), an E mode (economy mode), an L mode (arm crane mode=suspended load mode), a B mode (breaker mode), and an ATT mode (attachment mode). The P mode and the E mode are modes of when normal excavation or loading work is performed. The output of the engine 17 is suppressed in the E mode, compared with the P mode. The L mode is a mode switched when an arm crane operation (suspended load work) is performed. The arm crane operation is an operation in which a hook is attached to an attaching pin for coupling the bucket 13 and the link member, and a load hung on the hook is lifted. The L mode is a fine operation mode to suppress an engine speed to control the output of the engine 17 to be kept constant, and to be able to move the working device 3 slowly. The B mode is a mode switched when a breaker that crushes a rock is attached instead of the bucket 13, as an attachment, and work is performed. The B mode is also a mode to suppress the engine speed to control the output of the engine 17 to be kept constant. The ATT mode is an auxiliary mode switched when a special attachment such as crusher is attached instead of the bucket 13, and is a mode to control the hydraulic equipment and discharge amounts of the hydraulic oils of the hydraulic pumps 18, for example. A work mode signal generated when the operator operates the work mode switching unit 28 is sent to the engine controller 30 and the pump controller 31. Further, the swing lock unit 33 is a switch that turns ON/OFF of a swing parking brake (not illustrated). The swing parking brake is to brake the swing hydraulic motor 22 so as not to allow the upper swing body 5 to swing. The swing lock unit 33 is operated, so that an electromagnetic solenoid (not illustrated) is driven, and a brake that holds down rotary parts of the swing hydraulic motor 22 works, in conjunction with the movement of the electromagnetic solenoid. The ON/OFF signal of the swing parking brake in the swing lock unit 33 is also input to a monitor of the pump controller 31.

The engine controller 30 is configured from an arithmetic unit such as a CPU (numeric data processor) and a memory (storage device). A fuel injection device 80 is attached to the engine 17. For example, as the fuel injection device 80, a common rail-type fuel injection device is used. The engine controller 30 generates a signal of a control command, based on a set value of the fuel adjustment dial 29, sends the signal to the fuel injection device 80, and adjusts an injection amount of the fuel to the engine 17.

The pump controller 31 receives the signals transmitted from the engine controller 30, the monitor 32, the operation levers 41 and 42, and the travel levers 43 and 44, and generates signals of control commands for tilting and controlling swash plate angles of the hydraulic pumps 18 to adjust discharge amounts of the hydraulic oils from the hydraulic pumps 18. Note that signals from swash plate angle sensors 18*a* that detect the swash plate angles of the hydraulic pumps 18 are input to the pump controller 31. The swash plate angle sensors 18*a* detect the swash plate angles, so that pump capacities of the hydraulic pumps 18 can be calculated.

Further, the pump controller 31 receives the signals transmitted from the monitor 32, the pressure sensors 55 attached to the operation levers 41 and 42 and the travel levers 43 and 44, and the swing lock unit 33, and performs processing of measuring the work amount of the excavator 1. To be specific, the pump controller 31 performs processing of calculating the number of times of excavating and loading work (hereinafter, the number of times of loading) that is the base of the measurement of the work amount, and a basic excavating and loading time. Details of the number of times of loading and the basic excavating and loading time will be described below.

The pump controller 31 includes an operation state detection unit 31*a*, a time integration unit 31*b*, a determination unit 31*c*, a counting unit 31*d*, a mode detection unit 31*e*, a travel operation detection unit 31*f*, and a swing lock detection unit 31*g*. The operation state detection unit 31*a* detects the pilot pressures that are physical amounts output in response to the signals output from the pressure sensors 55 according to the operations of the operation levers 41 and 42. In the embodiment, the operation state detection unit 31*a* detects the pilot pressures that drive the bucket cylinder 16 and the swing hydraulic motor 22 in order to capture the excavating and loading work being performed. Note that, in the embodiment, the physical amounts output according to the operations of the operation levers 41 and 42 are used as the pilot pressures. This is because the operation levers 41 and 42 are pilot control levers. When the operation levers 41 and 42 are electric levers, the physical amounts are electrical signals such as voltages output by potentiometers or rotary encoders. Further, instead of detecting the pilot pressures, stroke amounts of the cylinders are directly detected by stroke sensors attached to the cylinder rods of the boom cylinder 14, the arm cylinder 15, and the bucket cylinder 16, for example, the rotary encoders, and detected data may be treated as the physical amounts output according to the operations of the operation levers 41 and 42. Stroke amounts of spool are detected using stroke sensors that detect operation amounts of spool of the valves, and detected data may be treated as the physical amounts output according to the operations of the operation levers 41 and 42. Further, flow rate sensors that detect flow rates of the physical oils from the main valves are used, and the flow rates may be used as the physical amounts. Further, angle sensors are respectively provided to revolving axes of the working devices 3 such as the boom 11, the arm 12, and the bucket 13, and an angle sensor that detects the angle of the upper swing body 5 is provided. Then, the operating angles of the working device 3 and the upper swing body 5 are directly detected with the respective angle sensors, and data of the detected operating angles of the working device 3 and the upper swing body 5 may be treated as the physical amounts output according to the operations of the operation levers 41 and 42. Note that, hereinafter, the bucket 13 and the upper swing body 5 are referred to as excavating and loading mechanism.

The time integration unit 31*b* calculates a time integration value by performing time integration of the pilot pressure. The determination unit 31*c* causes the time integration value and a predetermined operating angle of the excavating and loading mechanism associated with the operations of the operation levers 41 and 42 to correspond to each other, and determines that the operation levers 41 and 42 have been operated when the time integration value is a predetermined integration value or more. When the operations of the excavating and loading mechanism determined in the determination unit 31*c* have been performed in a predetermined order, the counting unit 31*d* counts the number of times of the operations (the number of times of the excavating and loading work, that is, the number of times of loading), treating the operations of the excavating and loading mechanism performed in the predetermined order, as one time. The series of operations of the excavating and loading mechanism is the excavating and loading work, and operations performed in an order of excavation, forward swing, soil removal, and return swing. The counting unit 31*d* treats the operations performed in the order as a pattern of the excavating and loading work, and counts the number of times by which the pattern is performed, as the number of times of loading. Details of the excavating and loading work will be described below.

The mode detection unit 31*e* detects a work mode switched and instructed in the work mode switching unit 28. The travel operation detection unit 31*f* determines whether the travel operations by the travel levers 43 and 44 have been performed, according to the signals that indicate the pilot pressures output by the pressure sensors 55. The swing lock detection unit 31*g* determines whether the swing lock unit 33 has turned the swing lock ON. Note that the operation state detection unit 31*a* detects whether the pressure sensors 55 that detect the pilot pressures are in an abnormal state. The abnormal state is, for example, a case where the pressure sensor 55 outputs an abnormal voltage values, which falls outside a range of normal voltage value, for a several seconds. Therefore, disconnection of the pressure sensor 55 is also treated as the abnormal state.

Figure 3:
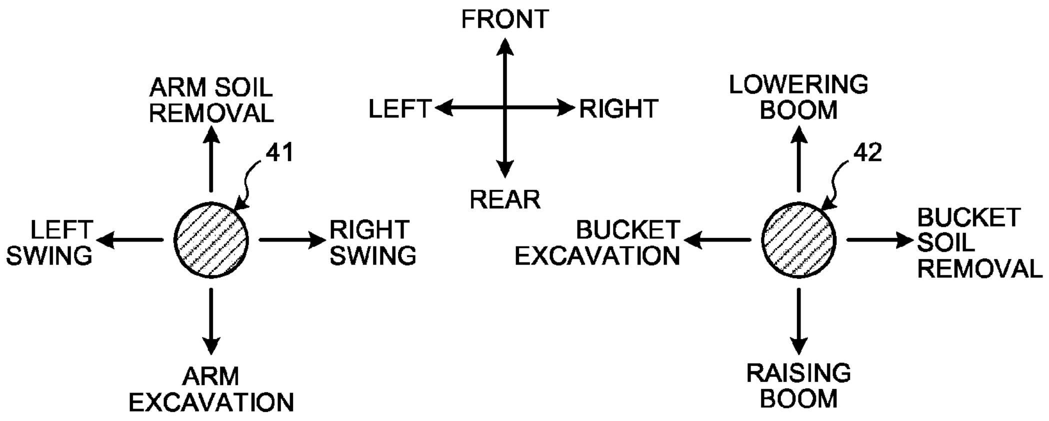
FIG. 3 is an explanatory diagram illustrating a relationship between an operating direction of an operation lever and movement of a working device or an upper swing body.

As described above, the operation levers 41 and 42 are arranged at the right and left of the operator seat (not illustrated) in the operator's cab 6. The operation lever 41 is arranged at the left-hand side when the operator seat is occupied by the operator, and the operation lever 42 is arranged at the right-hand side, which is the side opposite to the operation lever 41. Note that the operation lever 41 can drive the swing hydraulic motor 22 to perform left swing and right swing of the upper swing body 5 when being tilted rightward and leftward on the drawing, as illustrated in FIG. 3. Further, the operation lever 41 can extend and contract the arm cylinder 15 to perform arm soil removal and arm excavation when being tilted forward and rearward (upward and downward) on the drawing. The arm soil removal is an operation used when moving while rotating a tip of the arm 12 from the rear to the front of the excavator 1, and discharging the soil in the bucket 13. The arm excavation is an operation performed when moving while rotating the tip of the arm 12 from the front to the rear of the excavator 1, and scooping up the soil with the bucket 13. Meanwhile, the operation lever 42 can drive the bucket cylinder 16 to perform bucket excavation and bucket soil removal when being tilted rightward and leftward. Further, the operation lever 42 can drive the boom cylinder 14 to lower/raise the boom by being tilted forward and rearward (upward and downward) on the drawing. Note that the operation levers 41 and 42 can be tilted over the periphery. Therefore, combined operations can be performed with one lever. For example, work of the arm soil removal with left swing can be performed. Note that the travel lever 43 can perform right forward travel and right reverse travel according to the operation. Further, the travel lever 44 can perform left forward travel and left reverse travel according to the operation. That is, the right-side crawler belt 4*b* is driven when only the travel lever 43 is operated, the left-side crawler belt 4*b* is driven when only the travel lever 44 is operated, and the right and left crawler belts 4*b* are driven at the same time when the travel levers 43 and 44 are operated at the same time. Note that relationship between operating directions of the operation levers, and movement of the working device 3 and the upper swing body 5 illustrated in FIG. 3 are exemplarily illustrated. Therefore, the relationship between operating directions of the operation levers, and movement of the working device 3 and the upper swing body 5 may be different from FIG. 3.

Figure 4:
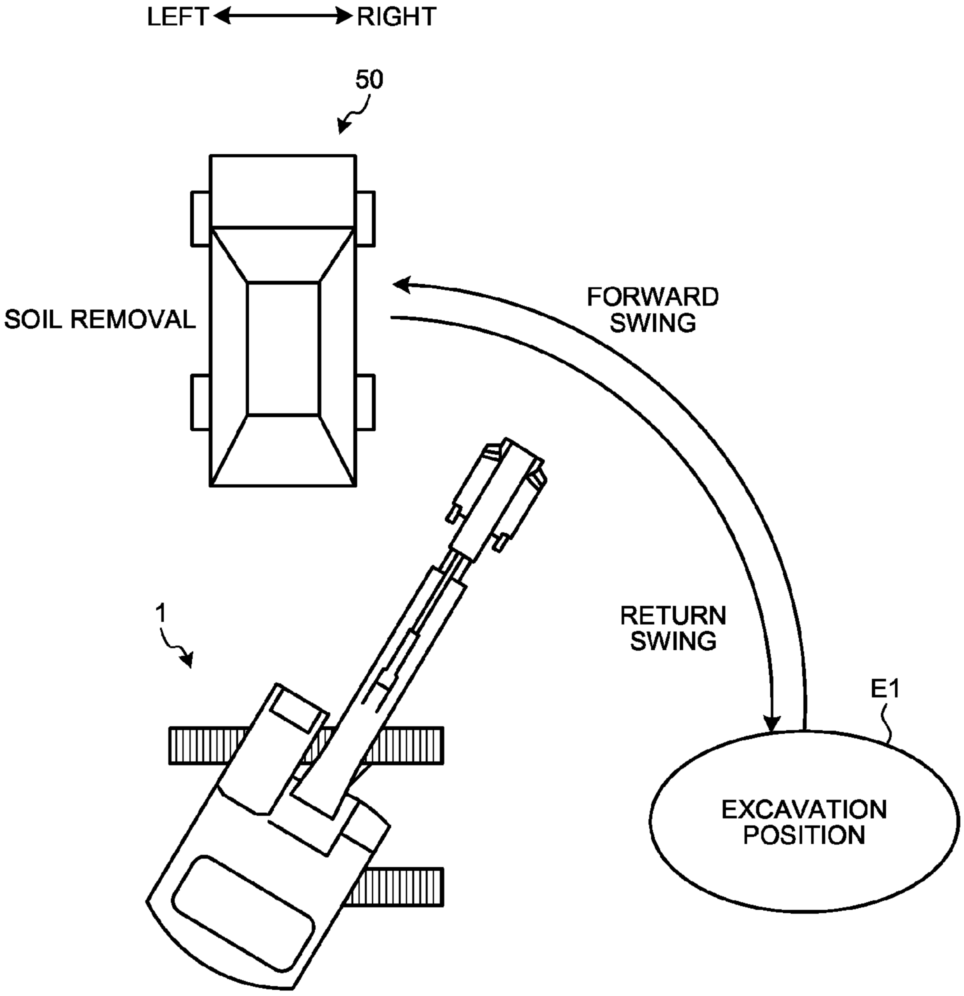
FIG. 4 is an explanatory diagram for describing excavating and loading work by the excavator.
Figure 5:
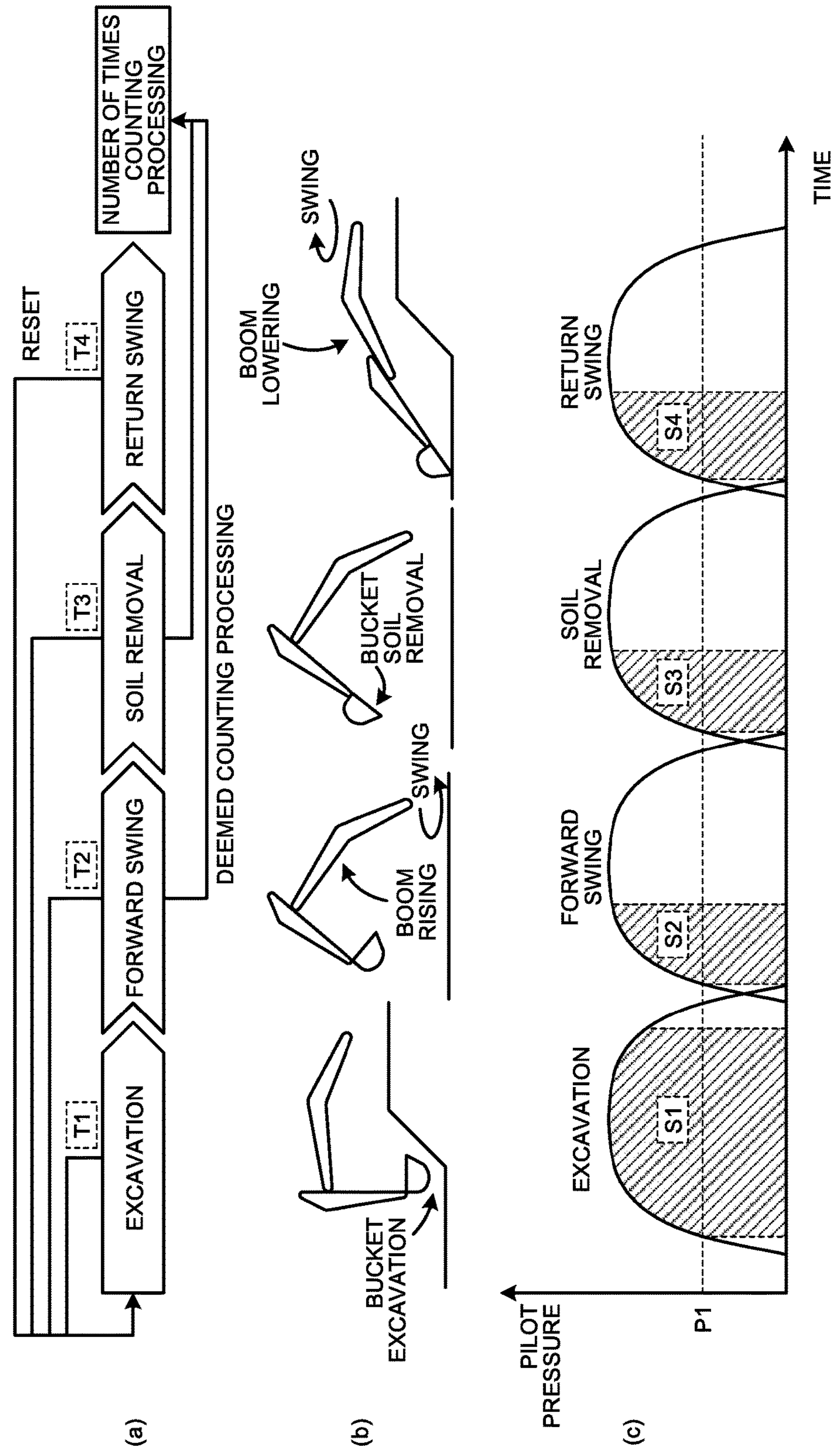
FIG. 5 is time charts for describing counting processing of the number of times of loading.

Measuring Processing of the Number of Times of Loading in Excavating and Loading Work First, the excavating and loading work by the excavator 1 will be described with reference to FIGS. 4 and 5. FIG. 4 illustrates a case where a dump truck 50 stands by on the left side of the excavator 1. That is, FIG. 4 illustrates a case where the dump truck 50 stands by at a side close to the operator's cab 6 when the excavator 1 faces a direction where an excavation position E1 exists. As illustrated in FIGS. 4, and 5(*a*) and 5(*b*), the excavating and loading work is a series of operations performed in the order of excavation, forward swing, soil removal, and return swing. The excavation is to tilt the operation lever 42 to the left and excavate soil and the like with the bucket 13 at the excavation position E1. In the case of FIG. 4, the forward swing is to tilt the operation lever 41 to the left up to the position of the dump truck 50 that carries the loaded soil and the like, and tilt the operation lever 42 rearward, and raise the boom 11 while causing the upper swing body 5 to perform left swing. The soil removal is to tilt the operation lever 42 to the right at the position of the dump truck 50 to remove the soil and the like scooped in the bucket 13. In the case of FIG. 4, the return swing is to tilt the operation lever 41 to the tight from the position of the dump truck 50 to the excavation position E1, tilt the operation lever 42 forward, and lower the boom 11 while causing the upper swing body 5 to perform right swing. Note that, when the excavation position E1 is positioned on the left side of the dump truck 50, the forward swing becomes the right swing, and the return swing becomes the left swing. In this case, when the excavator 1 faces the direction where the excavation position E1 exists, the dump truck 50 stands by at a side opposite to the operator's cab 6. That is, the forward swing is an operation to cause the upper swing body 5 to swing from the excavation position E1 to the position of soil removal of the dump truck 50, and the return swing is an operation to cause the upper swing body 5 to swing from the soil removal position to the excavation position E1.

Basic Measuring Processing of the Number of Times of Loading

When the number of times of loading is measured, the respective operations of the excavation, forward swing, soil removal, and return swing needs to be accurately detected. Therefore, in the embodiment, the time integration value that is the time-integrated pilot pressure, and a predetermined operating angle of the bucket 13 and the upper swing body 5 as the excavating and loading mechanism associated with the operations of the operation levers 41 and 42 are caused to correspond to each other by the time integration unit 31*b*, and when the time integration value becomes a predetermined integration value, it is determined that the operations by the operation levers 41 and 42 such as excavation have been performed. That is, the operations (the excavation, forward swing, soil removal, and return swing) of the excavating and loading work having being performed is determined using the time integration value of the pilot pressures. The determination is performed according to whether the obtained time integration value is the predetermined integration value or more. The predetermined integration value corresponds to a case where the excavating and loading mechanism that is the bucket 13 or the upper swing body 5 is moved by a predetermined angle in association with the operations. The predetermined angle, that is, the predetermined operating angle corresponds to an angle by which the excavating and loading mechanism is operated when the operations are performed. In terms of the bucket 13, an angle corresponding to the movement of the bucket 13 upon performing the operation of the excavation or the soil removal is the predetermined operating angle. In terms of the upper swing body 5, an angle corresponding to the movement of swing at the excavating and loading work is the predetermined operating angle. These predetermined operating angles have the same values in even an excavator 1 in a different vehicle size class, and the time integration value corresponding to the predetermined operating angle is different according to the vehicle size class. Therefore, even the excavator 1 in a different vehicle size class can measure the number of times of loading of each vehicle size class, as long as the correspondence between the time integration value that is the time-integrated pilot pressure obtained by the time integration unit 31*b* for each vehicle size class, and the predetermined operating angle of the excavating and loading mechanism associated with the operations of the operation levers 41 and 42 is determined in advance.

For example, in the excavation, as illustrated in FIG. 5(*c*), the pilot pressure generated when the operation lever 42 is tilted to the left in order to move the bucket 13 is detected, and when the pilot pressure becomes an integration start pressure P1 or more, the time integration of the pilot pressure is started. At a point of time when the time integration value becomes S1 or more, it is determined that the excavation operation has been performed. The time integration value S1 is the excavation time integration value S1, and corresponds to the predetermined operating angle of the bucket 13 for a case where the excavation has been performed. As for the operations of the forward swing, soil removal, and return swing, the time integration of each pilot pressure is started when the pilot pressure becomes the integration start pressure P1 or more. As for the forward swing and the return swing, the pilot pressure generated when the operation lever 41 is tilted leftward or rightward is detected, and a time integration value S2 or S4 is obtained. As for the soil removal, the pilot pressure generated when the operation lever 42 is tilted rightward is detected, and a time integration value S3 is obtained. The time integration value S2 of the forward swing, the time integration value S3 of the soil removal, and the time integration value S4 of the return swing are respectively corresponding to the predetermined operating angles of the upper swing body 5, the bucket 13, and the upper swing body 5. The fact that the time integration unit 31*b* obtains each of the time integration values S1 to S4 means that the bucket 13 or the upper swing body 5 has been moved by the operating angle or more.

That is, in the embodiment, whether each operation has been performed is determined using the time integration value of the pilot pressure as a threshold, which is defined with the predetermined operating angle of the upper swing body 5 and the bucket 13, that is, the excavating and loading mechanism. Then, when it is determined that the operations of the excavating and loading mechanism have been performed in the order of the excavation, forward swing, soil removal, and return swing, the number of times of loading is counted as one time, and the number of times of loading is cumulatively calculated. By use of the time integration value defined with the predetermined operating angle of the excavating and loading mechanism, the pilot pressures detected by the pressure sensors 55 mounted on the existing excavator 1 can be used. Therefore, the number of times of loading can be simply and easily performed. Furthermore, the time integration value is defined with the predetermined operating angle, and thus, even among the excavators 1 in different vehicle size classes, the different time integration values among the vehicle size classes may just be simply obtained in advance using the same predetermined operating angle, and the time integration values can be used as the thresholds of the operation determination. That is, such measuring processing of the number of times of loading has high versatility. Further, if such basic measuring processing of the number of times of loading is used, it is not necessary to perform setting that depends on a work site. Therefore, the number of times of loading can be measured without considering where the work site in which the excavator 1 is operated is.

Information of the accumulated number of times of loading is transmitted to the monitor 32, for example, and the monitor 32 measures the work amount. The measurement of the work amount is obtained by multiplication of the cumulatively calculated number of times of loading by a bucket capacity set in advance. A result of the measurement is displayed in a display unit of the monitor 32. Note that, in the embodiment, the operation time for the series of excavating and loading work is accumulated, and the accumulated operation time is output to the monitor 32, as the basic excavating and loading time, for example. The accumulated operation time is displayed on the display/setting unit 27 of the monitor 32. The measurement of the work amount may be performed using a computer or a mobile-type computer located outside the excavator 1, for example, located in a remote location. That is, the information of the accumulated number of times of loading is transmitted to the outside in a wireless or wired manner, a receiving device provided outside receives the accumulated number of times of loading, and the measurement of the work amount may be performed using the bucket capacity stored in an external storage device.

Figure 6:
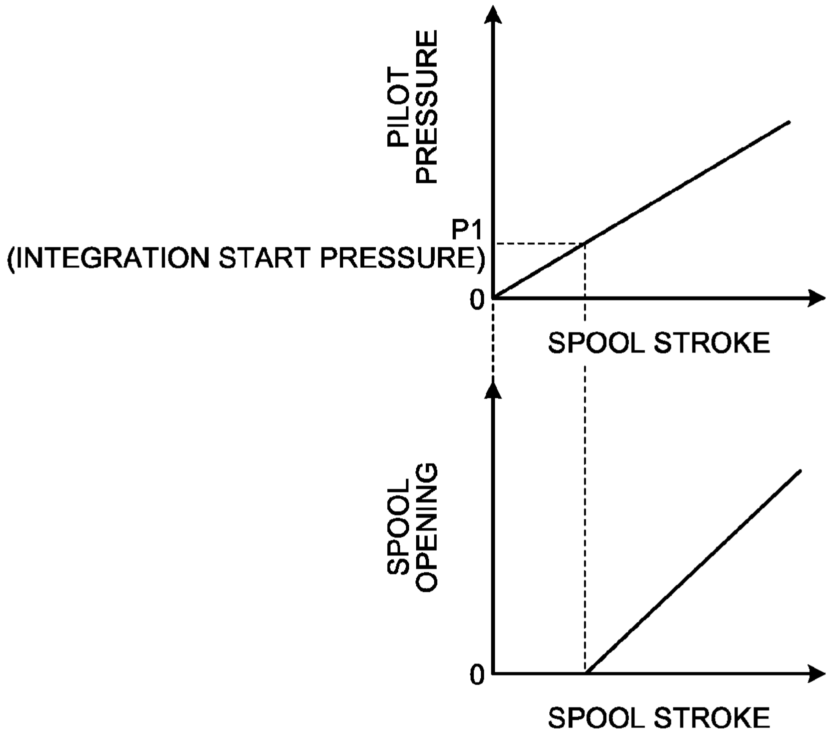
FIG. 6 is a diagram illustrating a relationship between a spool stroke and a pilot pressure, and a spool stroke and a spool opening.

FIG. 6 is a diagram illustrating change of the magnitude of the pilot pressure and the spool opening with respect to the spool stroke. Here, as illustrated in FIG. 6, in an area where the pilot pressure is small, the spool stroke of the main valve (not illustrated) is zero. Therefore, the time integration is started when the pilot pressure becomes the integration start pressure P1 or more.

Figure 7:
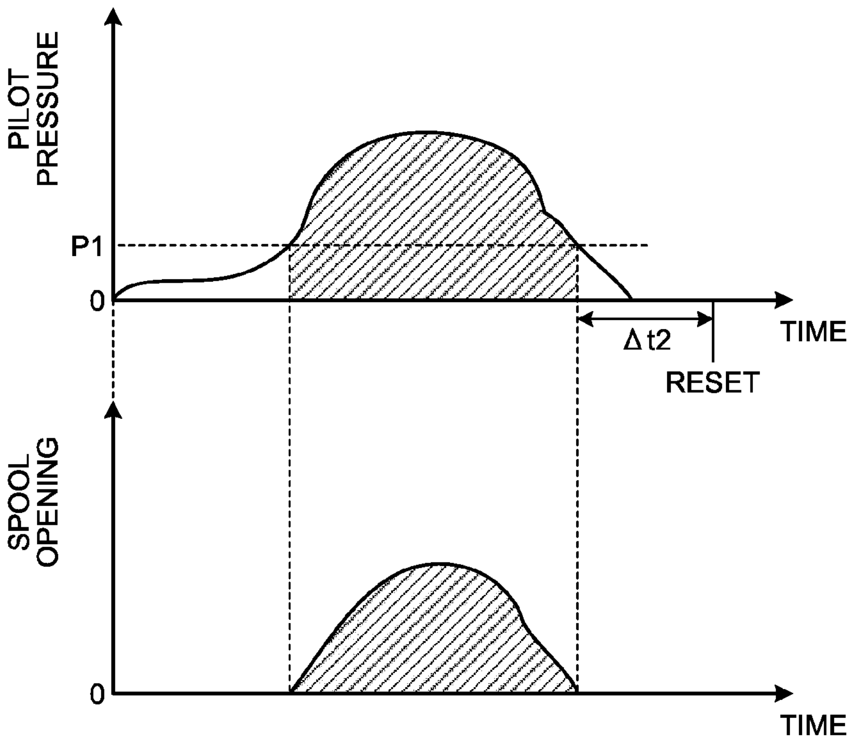
FIG. 7 is time charts illustrating reset processing of a time integration value at the time of an excavation operation.

Further, the time integration processing of the respective operations is simultaneously processed in parallel. Therefore, when the time integration values S1 to S4 of the respective operations are obtained, the time integration processing in the respective operations is reset, and the excavating and loading work is repeatedly performed, and thus the time integration processing needs to be repeatedly performed. FIG. 7 is time charts illustrating reset processing of the time integration value at the time of the excavation operation. The upper drawing of FIG. 7 illustrates the pilot pressure with respect to passage of time, and the shared area corresponds to the time integration value of the pilot pressure. Further, the lower drawing of FIG. 7 illustrates change of the spool opening with respect to passage of time, and the shaded area corresponds to the integration value of a spool opening area. As illustrated in FIG. 7, the reset processing is performed based on the time when the pilot pressure is lower than the integration start pressure P1. Further, to eliminate the effect of noises and the like, the reset processing is performed after a predetermined time Δt2 has passed after the pilot pressure becomes lower than the integration start pressure P1. That is, the integration start pressure P1 is the integration start pressure, as well as an operation termination predetermined value that is a threshold for determining termination of the operation. The predetermined time Δt2 is provided to the excavation operation and the soil removal operation, and has different value in each operation.

Figure 8:
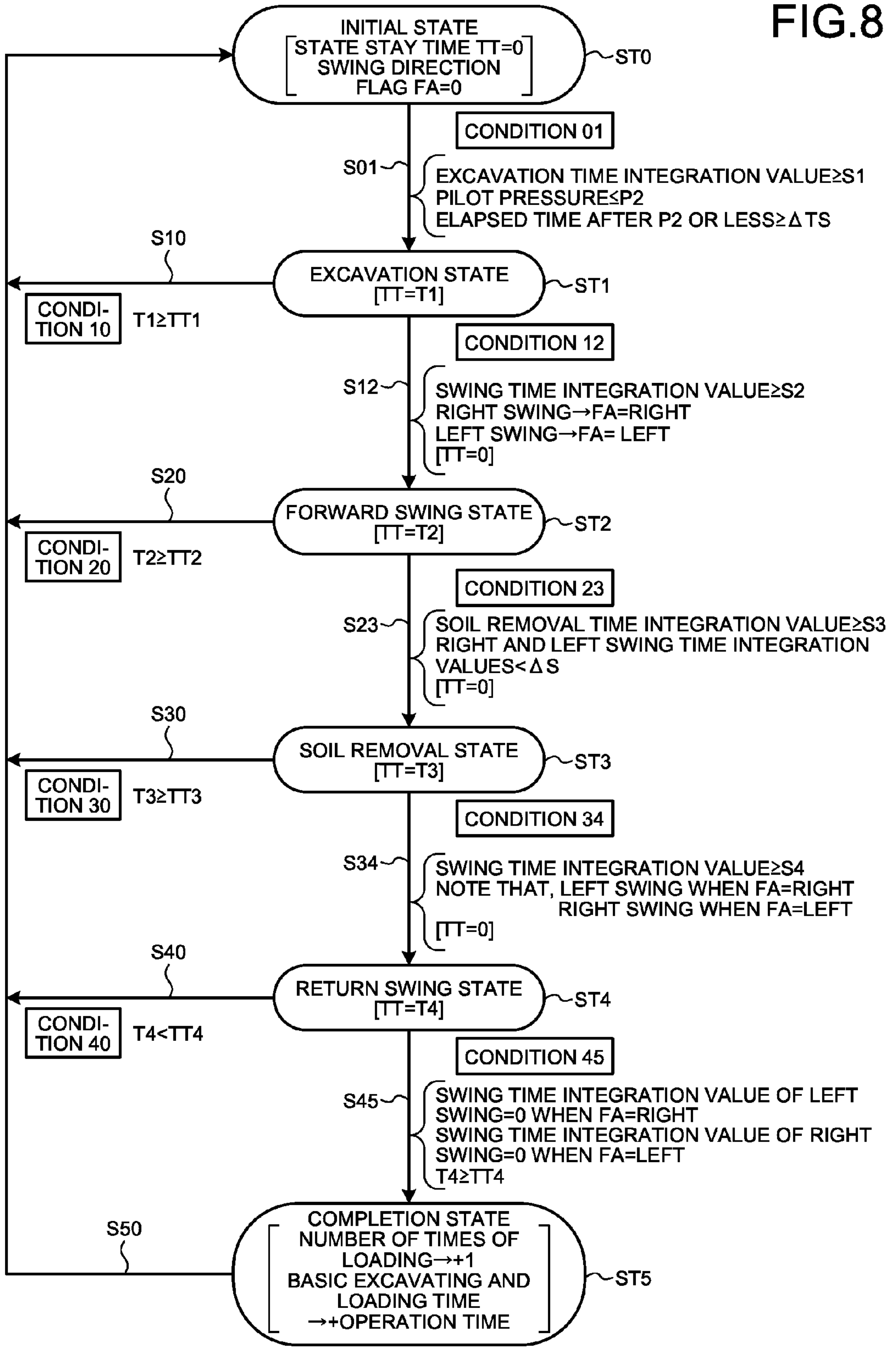
FIG. 8 is a state transition diagram illustrating basic measuring processing of the number of times of loading.

Here, the basic measuring processing of the number of times of loading will be described with reference to a state transition diagram illustrated in FIG. 8. In the basic measuring processing of the number of times of loading, there are an initial state ST0, an excavation state ST1, a forward swing state ST2, a soil removal state ST3, a return swing state ST4, and a completion state ST5.

First, in the initial state ST0, a state stay time TT is set to 0, and a swing direction flag FA is set to 0. When a condition 01 is satisfied in the initial state ST0, the processing is moved onto the excavation state ST1 (S01). The condition 01 is that the excavation time integration value is S1 or more and the pilot pressure is P2 or less, and an elapsed time after the pilot pressure becomes P2 or less becomes ΔTS or more. The pilot pressure P2 is a threshold used for determining whether the operation of the excavation is terminated, and state transition of FIG. 8 is possible. Details of the state transition diagram of FIG. 8 will be described below.

Figure 9:
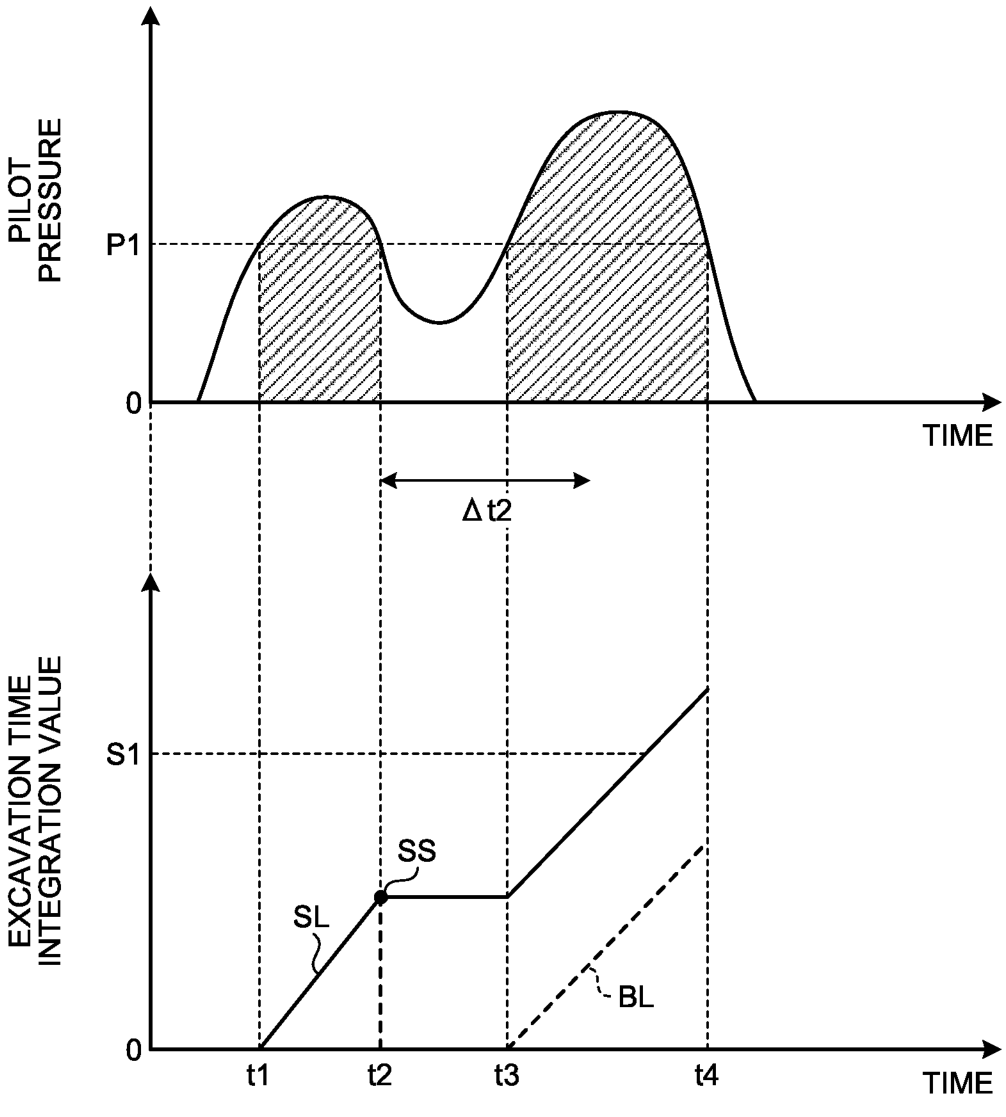
FIG. 9 is time charts for describing a time integration value hold time at the time of an excavation operation.

FIG. 9 is time charts for describing a time integration value hold time at the time of the excavation operation. Here, in the excavation operation, there is a case where a full lever operation to tilt the operation lever 42 to a tiltable stroke is not performed. That is, there is a case where the excavation operation is performed while the operation lever 42 is tilted and lifted up for excavation. As a result, an intermittent lever operation in which the pilot pressure with respect to the passage of time raises and lowers around the integration start pressure P1 may be performed, as illustrated in FIG. 9. Therefore, the elapsed time Δt2 (time integration value hold time) after the pilot pressure becomes the integration start pressure P1 or less is set to a substantially large value corresponding to the excavation operation so that the intermittent excavation operation can be determined as one excavation operation. Even if the pilot pressure becomes the integration start pressure P1 or less, the time integration processing is continued if the time integration value hold time Δt2 has not passed. Note that the swing operation is basically a full lever operation, and thus at the point of time when the pilot pressure becomes the integration start pressure P1 or less, the time integration processing is terminated, and the held time integration value is deleted (reset).

The lower drawing of FIG. 9 illustrates change of the excavation time integration value with respect to the passage of time. As illustrated in FIG. 9, if the time integration is reset immediately after the pilot pressure becomes the integration start pressure P1 or less at a point of time t2, only the excavation time integration value having the magnitude illustrated by a point of intersection SS is obtained, the point of intersection SS being of the broken line upwardly extending from the point of time t2 in the lower drawing of FIG. 9 and the solid line SL that indicates an increase in the excavation time integration value. In reality, at a point of time t4, the excavation time integration value as illustrated by the solid line SL in the lower drawing of FIG. 9 is obtained, and the excavation time integration value exceeds S1, so that it should be determined that the excavation operation has been performed. That is, if the time integration is reset immediately after the pilot pressure becomes the integration start pressure P1 or less at the point of time t2, the time integration value up to the point of time t2 is lost, and even if the time integration value is newly obtained from a point of time t3 and the time reaches the point of time t4 as illustrated by the broken line BL, the excavation time integration value cannot become S1 or more. In reality, although the excavation operation is performed during the period up to the point of time t4, the processing cannot be moved onto the excavation state ST1. Therefore, the time integration value hold time Δt2 having the predetermined length of time is set.

Figure 10:
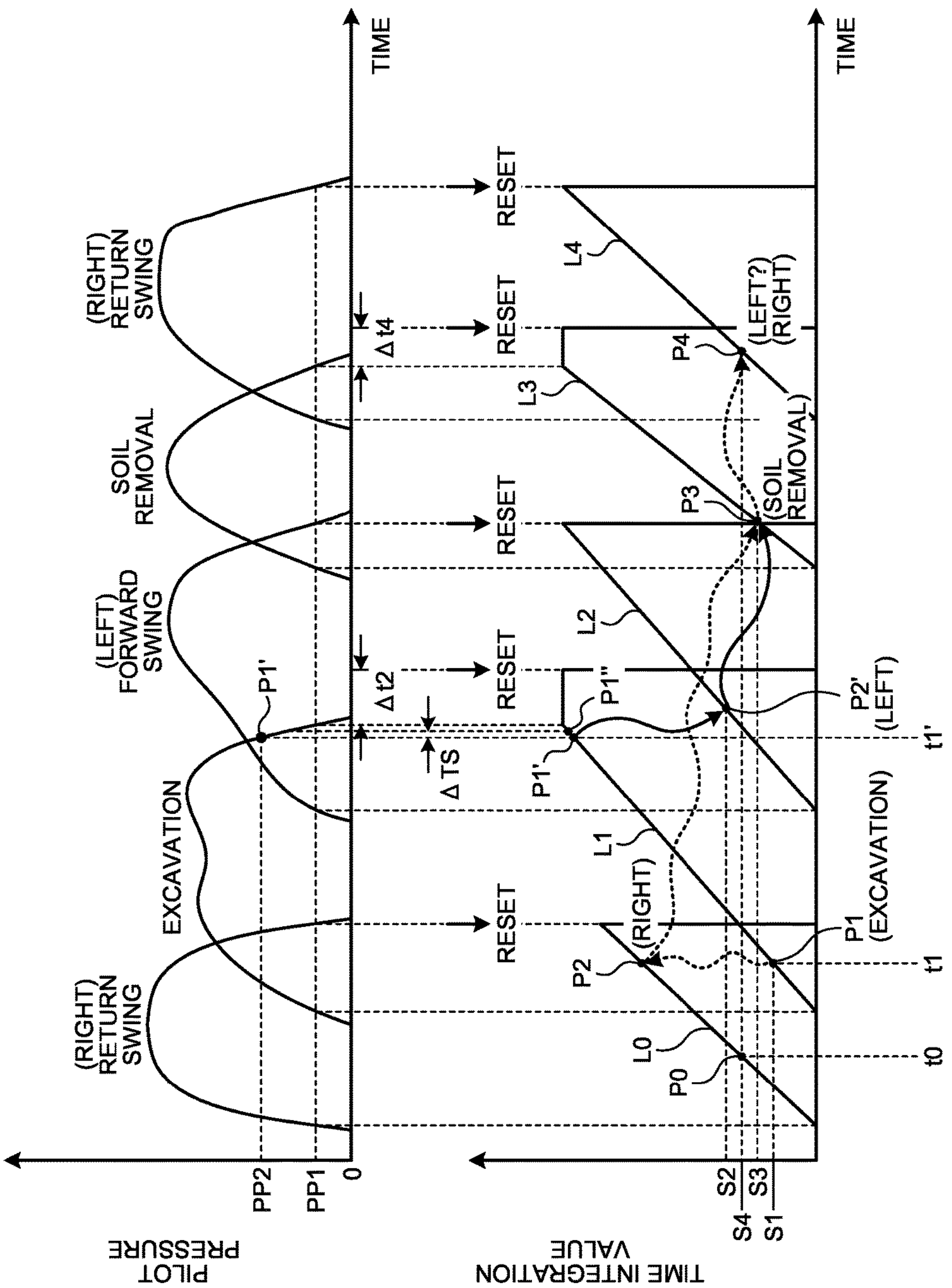
FIG. 10 is time charts illustrating relationship between erroneous determination and normal determination of a next return swing operation when an excavation operation is performed during a return swing operation.

By the way, there is a case where, in the excavating and loading work, the operation is moved onto the next excavation operation during the return swing operation, and there is a case where the next return swing operation is erroneously determined when the determination termination of the excavation operation is performed with the time integration value. That is, there is a case where the operation of the bucket excavation of the operation lever 42 is performed while the operation lever 41 is operated for the return swing, after the soil removal, is terminated. The excavator 1 in such a case performs movement that the bucket 13 performs the excavation while the upper swing body 5 swings in the direction of the return swing. FIG. 10 is time charts illustrating relationship between erroneous determination of the next return swing operation and normal determination of when the excavation operation is performed during the return swing operation. Note that although, in the upper diagram of FIG. 10, a pilot pressure is indicated by pilot pressure PP1, this is only descriptive change from the above-described pilot pressure P1, and has the same meaning. Further, although, in the upper diagram of FIG. 10, the pilot pressure is indicated by pilot pressure PP2, this is only descriptive change from the above-described pilot pressure P2, and has the same meaning. Curved lines L0 to L4 illustrated in the lower drawing of FIG. 10 are indicated by straight lines for convenience. The time integration value may be and may not be monotonously increased in a linear function manner depending on the way of the lever operation. In the description below, the increase in the time integration value is expressed as a curved line.

For example, as illustrated in FIG. 10, when the operation is moved onto the next excavation operation in the middle of the return swing operation, the time integration value of the curved line L0 is obtained in the first return swing operation, and termination determination of the return swing operation is performed at a point P0 (a point of time t0) on the curved line L0. In the next excavation operation, the time integration value of the curved line L1 is obtained, and the termination determination of the excavation operation is performed because the time integration value has reached S1 at a point P1 (a point of time t1) on the curved line L1. Then, the pump controller 31 acquires the time integration value of the next swing (forward swing). However, the pilot pressure of the return swing is lower than PP1, and thus the time integration value of the curved line L0 has not been reset, and the pump controller 31 acquires the time integration value of the point P2 on the curved line L0, as the time integration value of the forward swing. In the basic measuring of the number of times of loading, a rule is provided such that, in the case of the forward swing, either the right swing or the left swing is acceptable. However, in the case of the return swing, when the forward swing is the right swing, the return swing needs to be the opposite left swing, and when the forward swing is the left swing, the return swing needs to be the opposite right swing. When the operation lever 41 is tilted to either the right or the left, the pilot pressure of the right swing or the pilot pressure of the left swing is generated. Two pressure sensors 55 that detect the pilot pressure associated with the revolving operation are provided, and there are a pressure sensor 55 for detecting the pilot pressure of the right swing, and the pressure sensor 55 for detecting the pilot pressure of the left swing. For example, when the lever operation of the right swing has been operated, the swing direction flag FA is set to the signal output by the pressure sensor 55 that detects the pilot pressure of the right swing, and when the lever operation of the left swing is performed, the swing direction flag FA is set to the signal output by the pressure sensor 55 that detects the pilot pressure of the left swing. Note that, in the excavating and loading work, whether the left swing or right swing is performed after the excavation is determined according to the positional relationship among the excavation position E1, the excavator 1, and the dump truck 50. Therefore, as for the forward swing, right and left is not distinguished in the basic measuring processing of the number of times of loading. However, the forward swing and the return swing always have opposite swing directions, and thus the above rule is provided.

Here, the point P2 is the time integration value obtained from the pilot pressure generated at the time of the right swing, and thus the forward swing is determined as the right swing. Following that, the pump controller 31 acquires the time integration value of the soil removal operation that is the operation after the forward swing. Therefore, the time integration value of the normal forward swing exists on the curved line L2, but the state transition to the forward swing is skipped, and the operation of the soil removal is further performed, and the termination determination of the soil removal operation is performed because the time integration value has reached S3 at a point P3 on the curved line L3, which is the time integration value of the soil removal operation. Further, the pump controller 31 acquires the time integration value of the return swing operation. However, because the time integration value has reached S4 at a point P4 on the curved line L4, the return swing operation is performed. While the time integration value for determining that the return swing operation has been performed is satisfied, the swing direction is the right swing, instead of the left swing, although the forward swing has already been determined as the right swing, and thus erroneous determination to skip the return swing is performed.

Figure 11:
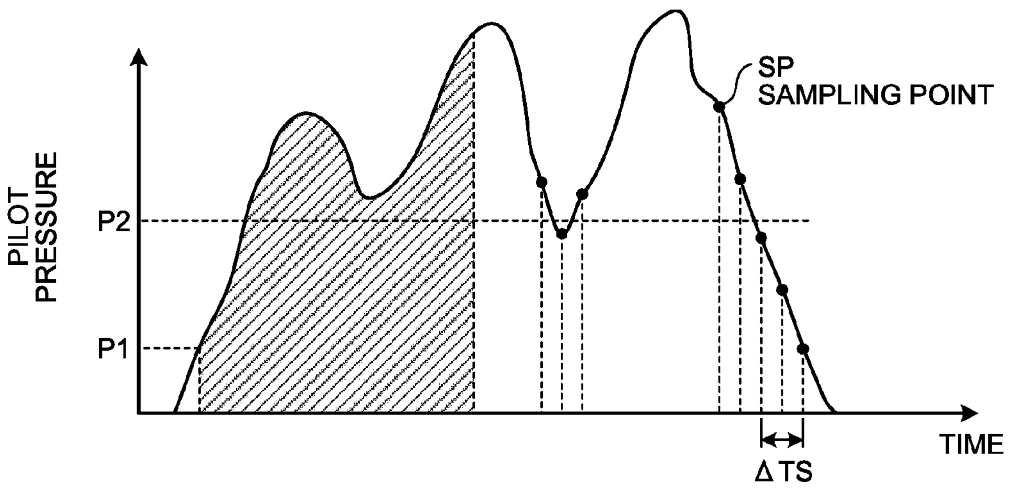
FIG. 11 is a graph illustrating change of a pilot pressure with respect to passage of time.

The reason why the erroneous determination is performed that the time integration value of the previous swing operation is not reset and is remained immediately after the point of time t1 when the termination determination of the excavation operation is performed at the point P1. Therefore, in the embodiment, the termination determination of the excavation operation is delayed, and at the time of the termination determination of the excavation operation, the time integration value of the return swing operation is caused to be in a reset state. To make this state, in addition to the fact that time integration value of the excavation operation is S1 or more, the pilot pressure becomes PP2 or less, and the termination determination of the excavation operation is performed after the elapse of a predetermined time ΔTS from the point of time when the pilot pressure becomes PP2 or less, in order to eliminate the effect of noises and the like. This predetermined time ΔTS is twice the sampling period (see FIG. 11), for example. FIG. 11 is a graph illustrating change of the pilot pressure with respect to the passage of time. That is, as illustrated in FIG. 11, the predetermined time ΔTS is twice the period of sampling the pilot pressure, and is a time obtained by doubling the time between two successive sampling points SP. In doing so, the termination determination of the excavation operation is not performed with the detection of the momentarily decreased pilot pressure, and the erroneous determination is prevented. Note that, as described above and in FIG. 9, the time integration processing of the excavation is reset at the point of time when the time integration value hold time Δt2 has passed from a point of time t1' when the pilot pressure generated by the excavation operation becomes the integration start pressure PP1 or less. Note that it is favorable to provide the predetermined time ΔTS like the embodiment. However, it is not necessarily provide the predetermined time ΔTS like the embodiment.

When such processing is performed, to be specific, as illustrated in FIG. 10, after the termination determination of the return swing is performed at the point P0 (point of time t0), the termination determination of the excavation operation is then provisionally performed at a point P1' (point of time t1') on the curved line L1 of the time integration value of the excavation, and the termination determination of the excavation operation is further performed at a point P1" after the elapse of the predetermined time ΔTS from the point P1'. Following that, the termination determination of the forward swing is performed because the time integration value of the forward swing has reached S2 at a point P2' on the curved line L2 that indicates the time integration value of the forward swing. Further, the termination determination of the soil removal operation is performed because the time integration value of the soil removal has reached S3 at the point P3 on the curved line L3. Further, the termination determination of the return swing can be normally performed because the time integration value of the return swing has reached S4 at the point P4 on the curved line L4.

Referring back to FIG. 8, when the state becomes the excavation state ST1, the state stay time TT of the excavation state ST1 is timed. Here, assume that the state stay time TT is T1. In the excavation state ST1, when a condition 12 is satisfied, the state is moved onto a forward swing state ST2 (S12). The condition 12 is that the swing time integration value is S2 or more. Note that, as described above, in the basic measuring processing of the number of times of loading, the swing direction of the forward swing accepts either right or left. However, for transition determination to a subsequent return swing state ST4, whether the operation is the right swing or the left swing is determined according to the pilot pressure generated according to the tilted operation of the operation lever 41, that is, the electrical signal output from the pressure sensor 55. As a result, the swing direction flag FA is set to right when the operation is the right swing, and the swing direction flag FA is set to left when the operation is the left swing. Further, at the transition to the forward swing state ST2, the state stay time TT is reset to 0.

Further, when a state stay time T1 of the excavation state ST1 is a predetermined time TT1 or more (condition 10), the state is moved onto the initial state ST0 (S10).

When the state becomes the forward swing state ST2, the state stay time TT of the forward swing state ST2 is timed. Here, assume that the state stay time TT is T2. In the forward swing state ST2, when a condition 23 is satisfied, the state is moved onto the soil removal state ST3 (S23). The condition 23 is that the soil removal time integration value is S3 or more, and the right and left swing time integration values are less than ΔS. Further, at the transition to the soil removal state ST3, the state stay time TT is reset to 0. The reason why whether the right and left swing time integration values are less than ΔS is provided in the condition 23 will be described. When the soil removal is performed, it is supposed the swing is not performed. The right or left swing time integration value is the time integration value of the pilot pressure generated by the right swing or left swing operation of the operation lever 41. In the forward swing state (ST2), by determining whether the swing with the right or left swing time integration value that exceeds the predetermined value (ΔS) is performed, whether the state transition can be moved onto the soil removal state ST3 is determined. If the right or left swing time integration value exceeds ΔS, work to swing while performing soil removal is expected, and for example, the work is to scatter the soil in a predetermined range. In this case, the state is moved onto the initial state ST0 (S20), the count of the number of times of loading is prevented from being erroneously determined.

Further, when a state stay time T2 of the forward swing state ST2 is a predetermined time TT2 or more (condition 20), the state is moved onto the initial state ST0 (S20).

When the state becomes the soil removal state ST3, the state stay time TT of the soil removal state ST3 is timed. Here, assume that the state stay time TT is T3. In the soil removal state ST3, when a condition 34 is satisfied, the state is moved onto the return swing state ST4 (S34). The condition 34 is that the swing time integration value is S4 or more. Note that it is also the condition that the swing time integration value is the time integration value of the left swing when the swing direction is the opposite direction to the forward swing, that is, when the swing direction flag FA is right, and the swing time integration is the time integration value of the right swing when the swing direction flag FA is left. Further, at the transition to the return state ST4, the state stay time TT is reset to 0.

Further, when a state stay time T3 of the soil removal state ST3 is a predetermined time TT3 or more (condition 30), the state is move onto the initial state ST0 (S30).

When the state becomes the return swing state ST4, the state stay time TT of the return swing state ST4 is timed. Here, assume that the state stay time TT is T4. In the return swing state ST4, when a condition 45 is satisfied, the state is moved onto the completion state ST5 (S45). The condition 45 is that the swing time integration value of the left swing is 0 when the swing direction flag FA is right, the swing time integration value of the right swing is 0 when the swing direction flag FA is left, and the state stay time T4 is a predetermined time TT4 or more.

Further, when the state stay time T4 of the return swing state ST4 is less than the predetermined time TT4 (condition 40), the state is moved onto the initial state ST0 (S40).

When the state becomes the completion state ST5, the number of times of loading is counted only once, and is cumulatively added. When there is the number of times of loading accumulated in the past, 1 is added to the number of times of loading. The obtained number of times of loading is stored in a storage device (not illustrated) provided in the pump controller 31. A timer function (not illustrated) is incorporated in the pump controller 31, and a time required from the start of the excavation to the completion of the return swing of when the number of times of loading is counted as one time is measured. That is, timing with the timer is started from when it has been detected that the pilot pressure of the excavation has exceeded the predetermined integration start pressure P1 as illustrated in FIG. 5, and then when the soil removal is performed after the forward swing, the return swing is performed, and the state is moved onto the completion state ST5, the timing with the timer is terminated. Then, the time from the start to the termination is obtained as the basic excavating and loading time. The obtained basic excavating and loading time is stored in the storage device (not illustrated) provided in the pump controller 31. Following that, the state is moved onto the initial state ST0 (S50).

Deemed Counting Processing

By the way, in the above-described series of excavating and loading work, there is a case where the operations from the excavation operation to the forward swing operation are performed in the first excavating and loading work, and the excavator 1 stands still in a state of waiting for the dump truck 50. Further, there is a case where the return swing is not performed after the soil removal, and the excavator 1 waits for the next dump truck 50 coming. In these cases, the timed state stay time T2 exceeds the predetermined time TT2, and the state is moved onto the initial state (S20). Therefore, one time of the number of times of loading is not cumulatively added, and the number of times of loading may be erroneously determined. Further, there is a case where, after the soil removal, the excavator 1 stands still without performing the return swing operation, and waits for the dump truck 50. Even in this case, the timed state stay time T3 exceeds the predetermined time TT3, and the state is moved onto the initial state (S30), one time of the number of times of loading is not cumulatively added, and the number of times of loading may be erroneously determined.

That is, in the basic measuring processing of the number of times of loading, in determining whether there has been an operation of the excavating and loading mechanism such as the excavation operation that configures the series of excavating and loading work, the state is moved onto the initial state and the measuring processing of the number of times of loading is reset if a condition to make transition to the next operation of the excavating and loading mechanism is not satisfied and a predetermined state stay time, which is the state of the same operation of the excavating and loading mechanism, has passed. However, even when such reset processing is performed, there is a specific state to be counted as the number of times of loading, and failure to notice such a specific state leads to erroneous determination.

Figure 12:
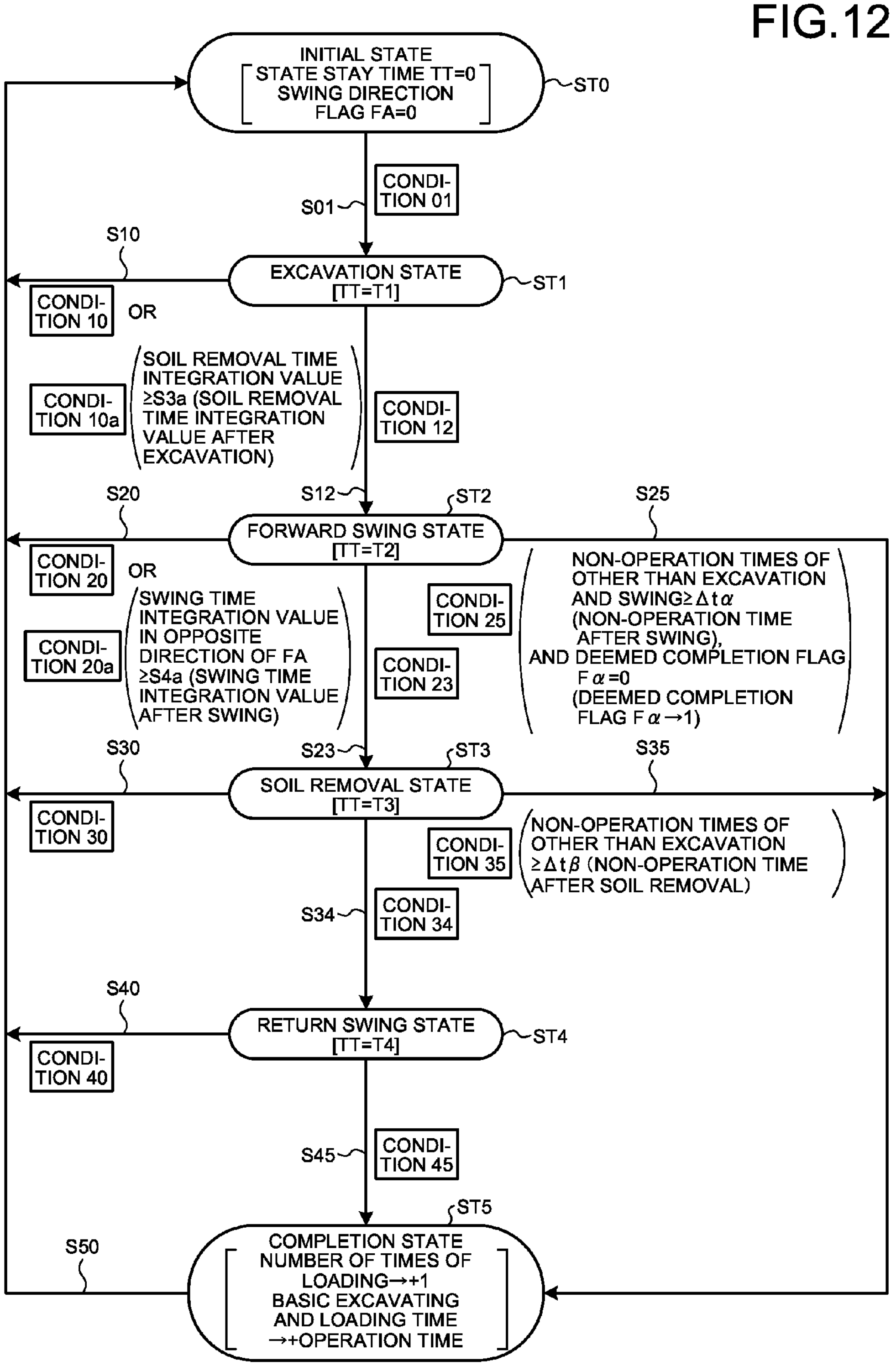
FIG. 12 is a state transition diagram illustrating the basic measuring processing of the number of times of loading including deemed counting processing and excluding processing of an incidental work operation.

Therefore, in the present embodiment, a state transition transfer condition illustrated in FIG. 12 is added, and deemed counting processing is performed, in which a specific operation, which may be performed in the operations of the series of excavating and loading work, is regarded as one time of the excavating and loading work being performed.

First, a non-operation time $\Delta t\alpha$ after swing is set in advance. When a specific state like a condition 25 is satisfied in the forward swing state ST2, the state is moved onto the completion state ST5, and the number of times of loading is cumulatively counted by one time (S25). The condition 25 is that non-operation times of other than the excavation and the swing are $\Delta t\alpha$ or more, and a deemed completion flag $F\alpha$ is 0, that is, the deemed counting processing has never been performed. The non-operation times of other than the excavation and the swing include a bucket soil removal non-operation time, a boom rising non-operation time, a boom lowering non-operation time, an arm excavation non-operation time, and an arm soil removal non-operation time, and all of the non-operation times become the non-operation time $\Delta t\alpha$ after swing or more. Note that the reason why the non-operation times of the excavation and the swing are excluded is that there is a case where the operation is stopped in the middle of the swing operation or there is a case where the bucket 13 is moved bit by bit and the operation is performed during standstill. This is because the bucket 13 filled with the soil and the like may sometimes be lowered under its own weight, and it is necessary to perform an operation to raise the lowered bucket 13 (an operation to tilt the operation lever 42 leftward, that is, to the bucket excavation side).

Note that a case that requires the deemed counting processing with the condition 25 is a case where the excavator 1 performs the excavating and loading work five times in order to fully load the soil on one dump truck 50. That is, the first (first time) series of excavating and loading work, or the last (fifth time) series of excavating and loading work, of the five times of excavating and loading work, requires the deemed counting processing. Therefore, when the condition 25 is satisfied, the deemed completion flag $F\alpha$ is set to 1, and the deemed completion flag $F\alpha$ being 0 is included in the condition 25. That is, the deemed counting processing having never been performed is included in the condition. Note that, when the soil removal operation is performed next, the deemed completion flag $F\alpha$ is set to 0.

Further, a non-operation time $\Delta t\beta$ after soil removal is set in advance. Then, when a specific state like a condition 35 is satisfied in the soil removal state ST3, the state is moved onto the completion state ST5, and the number of times of loading is cumulatively counted by one time (S35). The condition 35 is that the non-operation times of other than the excavation are the non-operation time $\Delta t\beta$ after soil removal or more. That is, when a specific state occurs, in which the order of the operations of the excavating and loading mechanism is stagnated and does not proceed, the deemed counting processing is performed. Note that the reason why the non-operation time of the excavation is excluded is that there is a case where an operation to move the bucket bit by bit is performed during standstill.

Excluding Processing of Incidental Work

By the way, incidental work may sometimes be included in the series of excavating and loading work in practical operation. For example, there is a case where the soil removal operation is performed immediately after the excavation operation, or a reverse swing operation is performed immediately after the swing operation. This incidental work is work in which the order of the operations of the excavating and loading mechanism, which configure the series of excavating and loading work, is different, and is similar to the series of excavating and loading work. Therefore, erroneous determination may occur. Therefore, in the present embodiment, such incidental work is treated as a specific state and is excluded in a positive manner so as to eliminate the erroneous determination. That is, when a specific state in which the order of the operations of the excavating and loading mechanism is skipped, that is, the incidental work occurs, the excluding processing of the incidental work is performed so as not to count the incidental work as the number of times of loading.

That is, in the excavation state ST1, a condition 10a with which the soil removal time integration value becomes a soil removal time integration value after the excavation S3*a* or more is added. When the condition 10a is satisfied, the state is moved onto the initial state ST0 (S10). The soil removal time integration value after the excavation S3*a* is a value set in advance. Further, in the forward swing state ST2, a condition 20a, with which the swing time integration value in the opposite direction to the swing direction indicated by the current swing direction flag FA becomes a value S4*a* or more, is added. When the condition 20a is satisfied, the state is moved onto the initial state ST0 (S20). The swing time integration value after the swing S4*a* is a value set in advance.

Excluding Processing According to External State

By the way, there is a case where a series of operations in which the travel levers 43 and 44 are operated and travel operations are mixed is not the series of excavating and loading operations. However, if such a case is not considered, the number of times of loading may be counted as long as the operations of the operation levers 41 and 42 are detected with the pilot pressures. Such erroneous determination needs to be eliminated.

Further, when the work mode is a mode in which the series of excavating and loading work is not performed, if such a case is not considered, the number of times of loading may be counted as long as the operations of the operation levers 41 and 42 are detected with the pilot pressures.

Further, when the swing lock unit 33 is operated and the swing lock of the upper swing body 5 is performed, the swing is not intended. However, if such a case is not considered, the number of times of loading may be counted as long as the operations of the operation levers 41 and 42 are detected with the pilot pressures.

Further, when the pressure sensor 55 that detects the pilot pressure is broken down, or when a communication line that connects the pressure sensor 55 and the pump controller 31 is disconnected, if such a case is not considered, a wrong time integration value is obtained, and the erroneous determination occurs. The erroneous determination in such a case needs to be eliminated.

The above states are states (specific operation states) in which a specific operation unrelated to the series of operations of the excavating and loading mechanism is performed in a state where an operation of the excavating and loading mechanism related to the operations of the series of excavating and loading work can be performed. In such a specific operation state, it is necessary to reset the counting processing of the number of times of loading to prevent the erroneous determination.

Figure 13:
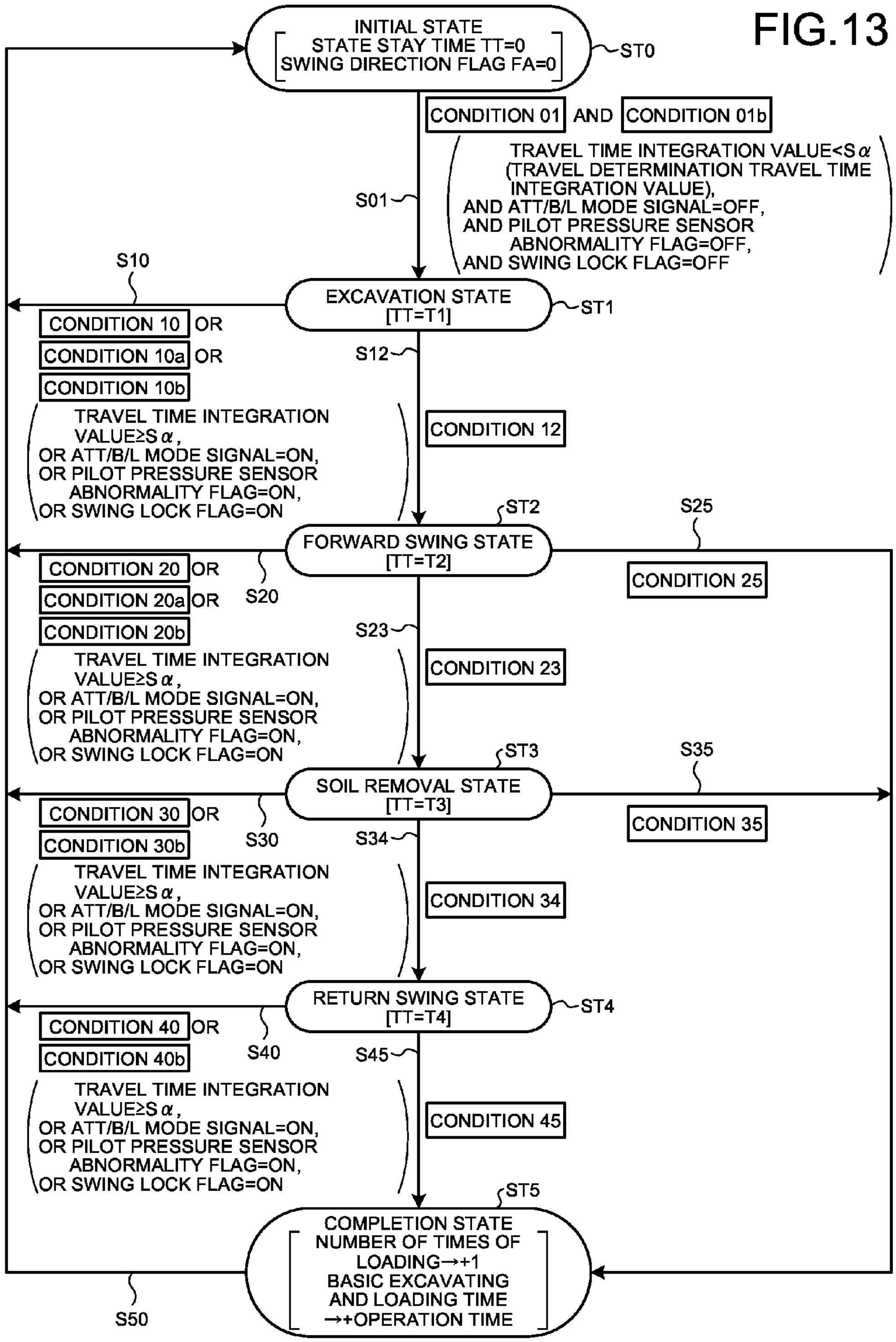
FIG. 13 is a state transition diagram illustrating the basic measuring processing of the number of times of loading including deemed counting processing, excluding processing of an incidental work operation, and excluding processing according to an external state.

Therefore, like the state transition diagram illustrated in FIG. 13, an exclusion condition is further added. However, as for the travel operation, there is a case where the operator may accidentally touch the travel levers 43 and 44 without intending the travel operation. In this case, the reset of the counting processing of the number of times of loading becomes the erroneous determination. Therefore, whether the state is the travel operation state is determined such that, similarly to the operations of the excavation, swing, and soil removal, the travel time integration values of the pilot pressures of the travel levers 43 and 44 are acquired, and when the acquired travel time integration values are a travel determination travel time integration value Sα or more, the state is determined to be the travel operation state. The travel determination travel time integration value Sα is a value set in advance. When the operator operates the travel levers 43 and 44, clearly intending the travel operation, a certain amount of travel time integration value should be obtained. As the certain amount of travel time integration value, Sα is set. Accordingly, even when the operator accidentally touches the travel levers 43 and 44 during the series of excavating and loading work, the counting processing of the number of times of loading can be normally performed.

That is, as illustrated in FIG. 13, when the state is the initial state ST0, a condition 01b is added to the condition 01 as an AND condition. The condition 01b is that the travel time integration value is less than the travel determination travel time integration value Sα, the work mode is not set to the ATT mode, the B mode, and the L mode (an ATT/B/L mode signal is OFF), there is no abnormality in the pressure sensors 55 that detect the pilot pressures (a pilot pressure sensor abnormality flag is OFF), and the swing lock unit 33 is not operated and the upper swing body 5 is swingable (a swing lock flag is OFF).

While the conditions 10 and 10a and the conditions 20 and 20a are OR conditions, conditions 10b, 20b, 30b, and 40b are further added as OR conditions. The conditions 10b, 20b, 30b, and 40b are that the travel time integration value is the travel determination travel time integration value Sα or more, or the work mode is set to any of the ATT/B/L modes (the ATT/B/L mode signal is ON), abnormality occurs in the pressure sensors 55 that detect the pilot pressures (the pilot pressure sensor abnormality flag is ON), or the swing lock unit 33 is operated and the upper swing body 5 is not swingable (the swing lock flag is ON). Note that, when the state is the above-described specific operation state, the above-described counting processing of the number of times of loading is not reset, and when the state is the specific operation state, the number of times of loading is tentatively cumulatively added, and the number of times of occurrence of the specific operation states may be separately subjected to the counting processing. Then, calculation to perform subtraction processing of the number of occurrence of the specific operation states from the obtained number of times of loading, that is, correction processing is performed, and the correct number of times of loading may be obtained. The subtraction processing is performed after termination of everyday work, whereby the obtained correct number of times of loading can be used in everyday work management. As described above, even there is the specific operation state, the counting processing of the number of times of the excavating and loading work is subjected to the reset processing or the correction processing, whereby the erroneous determination of the number of times of loading can be prevented.

Work Management Processing

Figure 14:
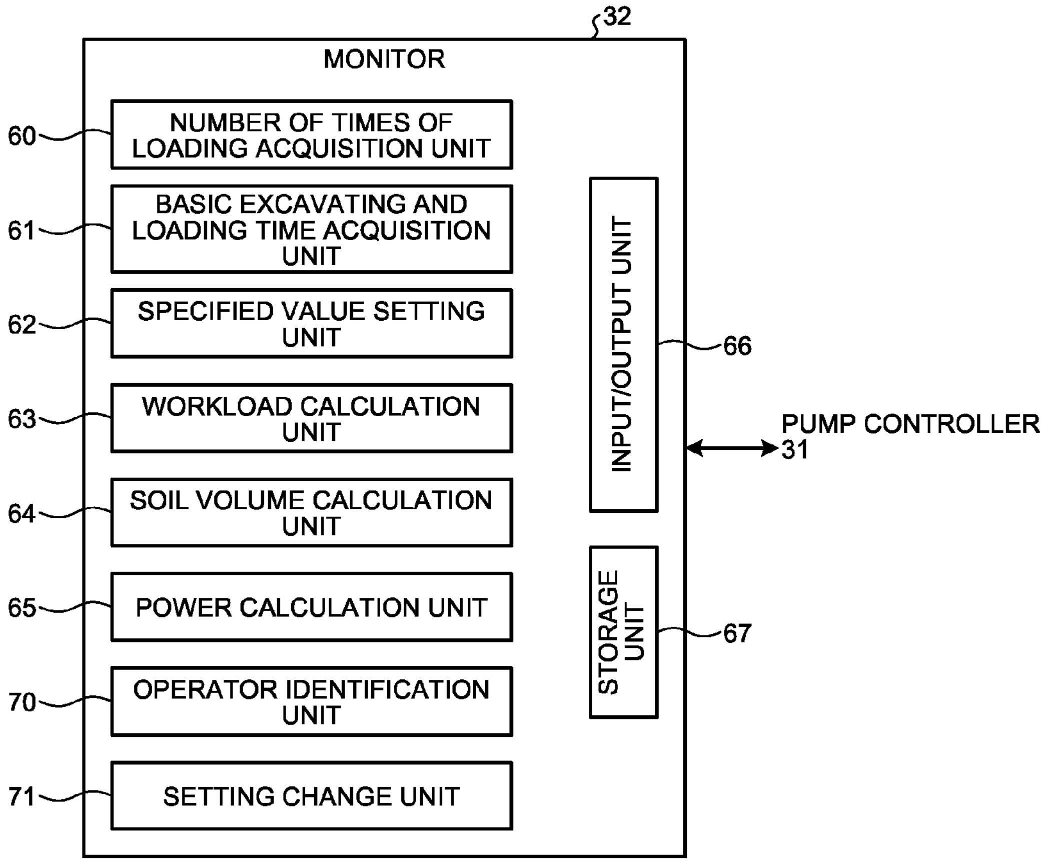
FIG. 14 is a block diagram illustrating a detailed configuration of a monitor.

The monitor 32 acquires at least the number of times of loading and the basic excavating and loading time from the storage device (not illustrated) of the pump controller 31. As illustrated in FIG. 14, the monitor 32 includes a number of times of loading acquisition unit 60, a basic excavating and loading time acquisition unit 61, a specified value setting unit 62, a workload calculation unit 63, a soil volume calculation unit 64, a power calculation unit 65, an input/output unit 66, and a storage unit 67. Further, the monitor 32 includes an operator identification unit 70 and a setting change unit 71.

The specified value setting unit 62 stores, in the storage unit 67, the bucket capacity of the excavator 1, the number of dump trucks, data that indicates a dump truck load capacity, which are set and input through the input/output unit 66. The dump truck load capacity is an amount of soil that can be loaded on one dump truck. Note that, in the present embodiment, a case of loading the soil on the dump truck 50 has been described. However, when the excavator 1 loads the soil and the like on a carrying vessel that includes a carrier used for dredging work of port and harbor, in place of the dump truck 50, work management processing as described below can be executed. The load capacity and the number of the carrying vessels are stored in the storage unit 67. Further, when the soil and the like are excavated and loaded on a train or a cart, in place of the dump truck 50, necessary data is stored in the storage unit 67, so that the work management processing can be executed. That is, the present embodiment can be applied to when the soil and the like are loaded onto various collecting bodies such as the dump truck 50, the carrying vessel, the train, and the cart.

The workload calculation unit 63 calculates the workload obtained by integrating the number of times of loading acquired by the number of times of loading acquisition unit 60 and the bucket capacity, and stores the obtained workload in the storage unit 67 for each day, for example. The soil volume calculation unit 64 calculates the soil volume obtained by multiplying the number of dump trucks by the dump truck load capacity, and stores the obtained soil volume in the storage unit 67 for each day, for example. The power calculation unit 65 calculates a value obtained by dividing the soil volume by the workload, as power, and stores the obtained power in the storage unit 67 for each day, for example.

Here, the workload is deemed as a sum of the soil volume and work to be counted. The work to be counted means work that is not the actual excavating and loading work by the excavator 1. For example, when the soil is not actually excavated, and the bucket 13 is operated and the upper swing body 5 is operated to swing, such operations may be determined as one time of excavating and loading work (the number of times of loading). In this way, when an operation of the excavating and loading mechanism not like the actual excavating and loading work is performed (when the work to be counted is performed), whether the soil is in the bucket 13 is not detected, and thus the number of times of loading is counted. Therefore, the number of times of loading obtained by the number of times of loading acquisition unit 60 becomes a larger number of times than the number of times of loading corresponding to the soil volume. That is, there is a case where the workload and the soil volume are not completely the same. The workload in such a case becomes a larger value than the soil volume. Therefore, if the power is obtained, to what extent the work to be counted has been performed can be grasped, and to what extent the excavating and loading work has been performed can be thus grasped.

The monitor 32 makes a graph about data such as the workload, the soil volume, and the power, for each day, and outputs the data from the input/output unit 66. The graph using the data may be displayed on the display/setting unit 27 of the monitor 32. Further, the monitor 32 may output the data such as the workload, the soil volume, and the power to an outside of the excavator 1.

Figure 15:
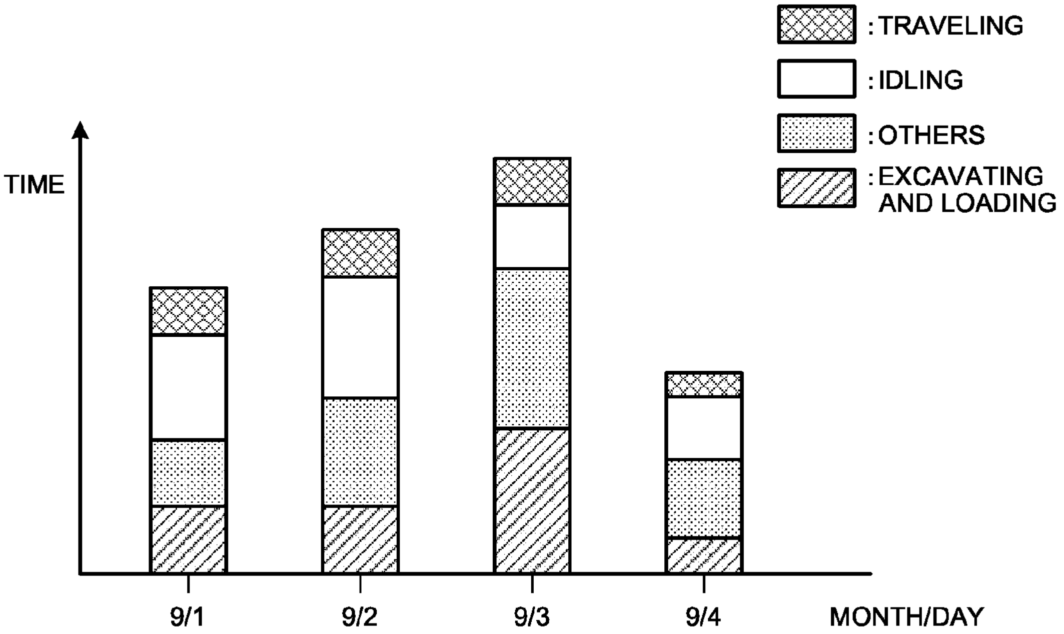
FIG. 15 is a diagram illustrating a display example of work management using a basic excavating and loading time.

Further, the monitor 32 outputs and displays a ratio of the excavating and loading work time to the operation time of the excavator 1 for each day, as illustrated in FIG. 15, using the basic excavating and loading time obtained in the basic excavating and loading time acquisition unit 61, the travel time obtained from the engine controller 30 and the like, and moving body information such as an idling time. The above-described data (the workload, the soil volume, the power, and the ratio of the excavating and loading work time to the operating time of the excavator 1) may be obtained with a work management system described below, at an outside of the excavator 1. For example, the data such as the number of times of loading, the basic excavating and loading time, the travel time, the idling time, and the operation time, which can be obtained in the excavator 1 output from the input/output unit 66 or the storage device (not illustrated) of the pump controller 31 to an outside in a wired or wireless manner, and the soil volume, the workload, the power, and the ratio of the excavating and loading work time to the operating time may be obtained and made into a graph by a computer provided outside, and displayed in a display device connected to the computer. A mobile terminal may be used instead of the computer provided outside, or a display device of a mobile terminal may be used instead of the display device. FIG. 15 illustrates the ratio of the excavating and loading time of each day of a certain excavator 1. The embodiment is not limited thereto, and the ratios of the excavating and loading time can be similarly obtained with respect to a plurality of excavators 1, and compared for each excavator.

Note that the operator identification unit 70 identifies operator identification information (hereinafter, identification information), and holds the identified identification information, and the number of times of loading and the basic excavating and loading time of each operator, in the storage unit 67, in association with each other.

Here, the excavator 1 may mount an immobilizer device. Engine start of the excavator 1 is possible with an ID key in which individual identification information is stored. When the immobilizer device reads the identification information of the ID key, the identification information, a predetermined period, for example, the number of times of loading of one day are associated with each other, for example, and the associated information (the number of times of loading of each operator) is output to an outside through the input/output unit 66, whereby the operator management to manage which operator has performed how much work (excavating and loading work) becomes possible.

Further, when one excavator 1 is used by a plurality of operators, a plurality of ID keys is used. Therefore, work amount management of each operator can be performed about the one excavator 1. Further, when it is set to enable the engine start of a plurality of excavators 1 with one ID key, data of vehicle identification information that identifies respective vehicles of the plurality of excavators 1, the identification information of the ID key, data of the number of times of loading, and the like are output to an outside, whereby to what extent of the work amount has been performed by one operator with which excavator can be managed.

Further, the above-described management may be performed such that the individual ID number is input through the input/output unit 66 of the monitor 32 without using the immobilizer device, and an ID number identification device that recognizes the operator or an ID card reading device is provided, and the operator is individually recognized. Note that a fingerprint authentication device may be used as a device to individually recognize the operator. That is, with the operator identification unit 70, the work management of the operator can be performed.

Further, the setting change unit 71 can change various setting values (parameters) necessary for determining the series of excavating and loading operations such as the time integration values S1 to S4 and the integration start pressure P1. The setting change unit 71 can change the various setting values from an outside through the input/output unit 66, using an external communication device that can perform communication in a wireless or wired manner. Note that the various setting values may be changed through the input/output unit 66, using input means such as a switch provided in the display/setting unit 27 of the monitor 32.

Note that the various setting values can be set by teaching or statistical processing. For example, the setting change unit 71 can change the setting of the various setting values (parameters) such as the integration start pressure P1 for each operator or work site, by teaching. To be specific, an operation of the bucket excavation is actually performed, and the bucket is operated from an excavation start attitude to an excavation end attitude of the bucket. In the excavation start attitude, a predetermined memory button (not illustrated) is operated, and in the excavation end attitude, the predetermined memory button (not illustrated) is further operated. Accordingly, the time integration value S1 of the pilot pressures at the time of respective operations generated between the operations of the memory button is acquired, and the time integration value is used as the setting value. The memory button may be provided at the operation levers 41 and 42, or may be provided on the monitor 32. Further, other setting values can be set by similar teaching.

Meanwhile, when the various setting values are changed by the statistical processing, a predetermined number of times of excavating and loading work is conducted in advance, the predetermined operating angle or the data such as the time integration values S1 to S4 of the pilot pressures at the time of respective operations are statistically obtained using the results, the statistical processing of obtaining average values of the data and the like is performed, and obtained results may be used as the setting values.

Work Management System

Figure 16:
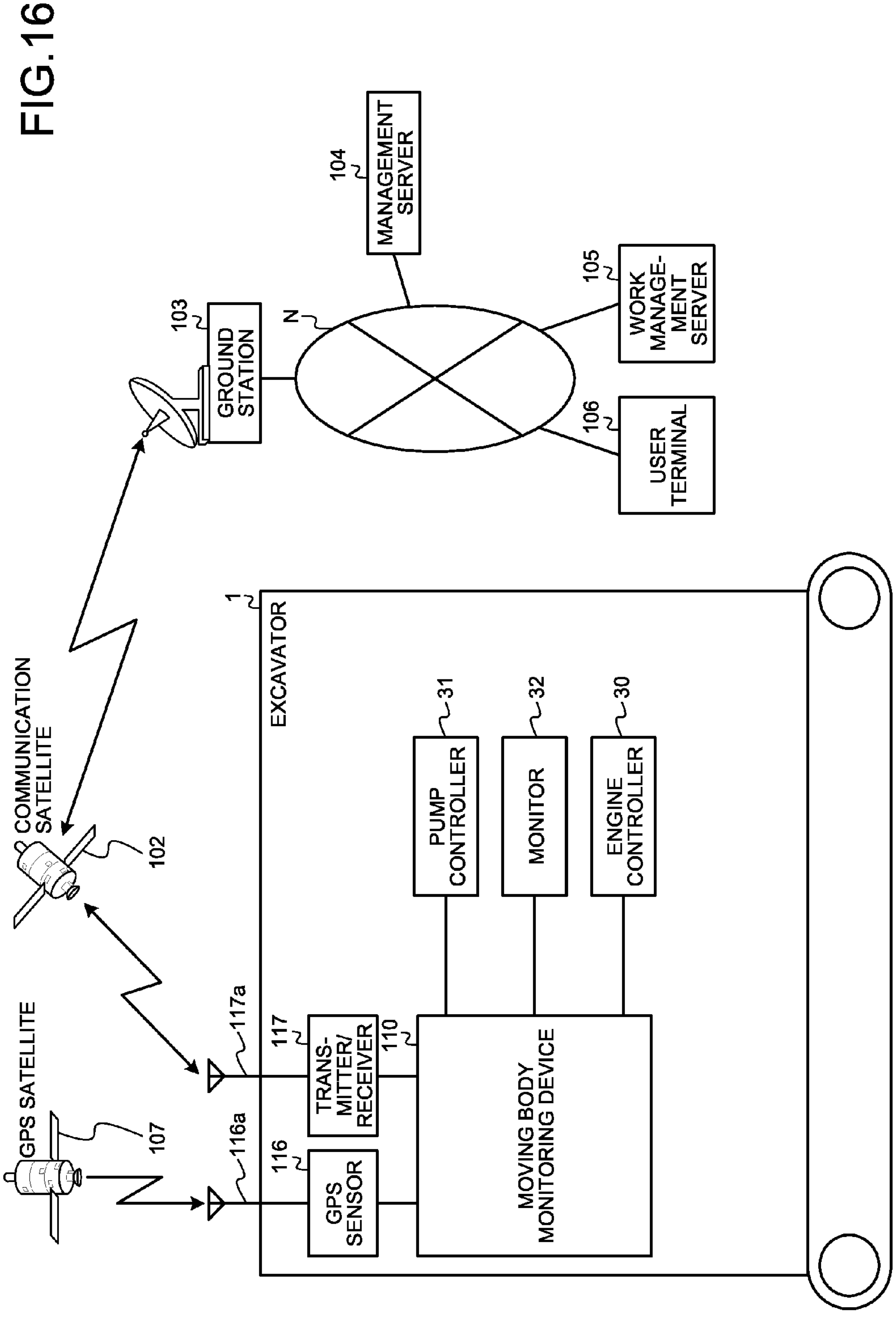
FIG. 16 is a diagram illustrating a schematic configuration of a work management system including an excavator.

FIG. 16 is a diagram illustrating a schematic configuration of a work management system including the excavator 1. In the work management system, moving bodies such as a plurality of excavators 1 are geographically dispersed, and the excavators 1 and a management server 104 are communication-connected through external communication devices such as a communication satellite 102, a ground station 103, and a network N such as the Internet. A work management server 105 that is a server of an administrator of the excavators 1 and a user terminal 106 are connected to the network N. The excavators 1 transmits, to the management server 104, work information including the number of times of loading and the basic excavating and loading time, and moving body information that is vehicle information including information indicating an operation state, such as position information, an operating time, a travel time, an idling time, and vehicle identification information of the excavator 1, and identification information of the operator. The management server 104 transfers the work information and the moving body information to the corresponding work management server 105 of each administrator.

The excavator 1 includes a moving body monitoring device 110, and the moving body monitoring device 110 is connected to a GPS sensor 116 and a transmitter/receiver 117. The GPS sensor 116 detects an own position, based on information transmitted from a plurality of GPS satellites 107 through an antenna 116*a* to generate own position information, and the moving body monitoring device 110 acquires the own position information. The transmitter/receiver 117 is communication-connected to the communication satellite 102 through an antenna 117*a*, and processing of transmitting/receiving information is performed between the moving body monitoring device 110 and the management server 104.

The work management server 105 has the same configuration and function as the monitor 32. The input/output unit 66 of the monitor 32 corresponds to the user terminal 106. Therefore, by accessing the work management server 105, the user terminal 106 can perform work management similar to the monitor 32, and can perform a wide range of and a large number of work management.

That is, fleet management can be performed in relation to progress of the work or efficiency of the work from a place away from a work site.

Note that the work management server 105 does not necessarily have the same configuration and function as the monitor 32, and the monitor 32 may be kept having the configuration and function illustrated in FIG. 14. In this case, the user terminal 106 accesses the work management server 105 and can perform the setting change of various setting values with respect to the setting change unit 71 of the monitor 32 through the work management server 105 and the management server 104. Further, a part of the configuration and function of the monitor 32 may be included in the management server 104 or the work management server 105.

Further, the excavator 1 has a satellite communication function. However, the function is not limited thereto, and the excavator 1 may have various communication functions such as a wireless LAN communication function and a mobile communication function. That is, the excavator 1 includes an external communication function. Further, when wireless communication is not available in a place where an infrastructure related to wireless communication has not been set up, a connector that enables wired connection for data communication is provided in the excavator 1, as a configuration that achieves the external communication function by wired communication and the work information and the moving body information may be downloaded through the wired communication.

REFERENCE SIGNS LIST

1 EXCAVATOR
2 VEHICLE BODY
3 WORKING DEVICE
4 LOWER TRAVELING BODY
5 UPPER SWING BODY
11 BOOM
12 ARM
13 BUCKET
14 BOOM CYLINDER
15 ARM CYLINDER
16 BUCKET CYLINDER
17 ENGINE
18 HYDRAULIC PUMP
18*a* SWASH PLATE ANGLE SENSOR
20 CONTROL VALVE
21 HYDRAULIC TRAVEL MOTOR
22 SWING HYDRAULIC MOTOR
27 DISPLAY/SETTING UNIT
28 WORK MODE SWITCHING UNIT
29 FUEL ADJUSTMENT DIAL
30 ENGINE CONTROLLER
31 PUMP CONTROLLER
31*a* OPERATION STATE DETECTION UNIT
31*b* TIME INTEGRATION UNIT
31*c* DETERMINATION UNIT
31*d* COUNTING UNIT
31*e* MODE DETECTION UNIT
31*f* TRAVEL OPERATION DETECTION UNIT
31*g* SWING LOCK DETECTION UNIT
32 MONITOR
33 SWING LOCK UNIT
41 and 42 OPERATION LEVER
43 and 44 TRAVEL LEVER
50 DUMP TRUCK
55 PRESSURE SENSOR
60 NUMBER OF TIMES OF LOADING ACQUISITION UNIT
61 BASIC EXCAVATING AND LOADING TIME ACQUISITION UNIT
62 SPECIFIED VALUE SETTING UNIT
63 WORKLOAD CALCULATION UNIT
64 SOIL VOLUME CALCULATION UNIT
65 POWER CALCULATION UNIT
66 INPUT/OUTPUT UNIT
67 STORAGE UNIT
70 OPERATOR IDENTIFICATION UNIT
71 SETTING CHANGE UNIT
80 FUEL INJECTION DEVICE
102 COMMUNICATION SATELLITE
103 GROUND STATION

104 MANAGEMENT SERVER
105 WORK MANAGEMENT SERVER
106 USER TERMINAL
107 GPS SATELLITE
110 MOVING BODY MONITORING DEVICE
116 GPS SENSOR
116*a* and 117*a* ANTENNA
117 TRANSMITTER/RECEIVER
N NETWORK
P1 INTEGRATION START PRESSURE
S1 to S4 TIME INTEGRATION VALUE

The invention claimed is:

1. A working machine comprising:

a controller that is:

configured to detect a physical amount output according to an operation of an operation lever, configured to calculate a time integration value by performing time integration of the physical amount, configured to cause the time integration value and a predetermined operating angle of an excavating and loading mechanism associated with the operation of the operation lever to correspond to each other, and to determine that the operation of the operation lever has been performed at a time the time integration value becomes a predetermined integration value or more, and configured to count, when a determined operation of the excavating and loading mechanism is performed in a predetermined order, number of times of excavating and loading work, treating the operation of the excavating and loading mechanism performed in the predetermined order, as one time, wherein the operation of the excavating and loading mechanism includes at least an excavating operation and a swing operation.

2. The working machine according to claim 1, wherein the operation of the excavating and loading mechanism is excavating and loading operations performed in an order of an excavation operation, a forward swing operation, a soil removal operation, and a return swing operation.

3. The working machine according to claim 2, wherein the controller is configured to determine that the excavation operation has been performed at a time the time integration value is the predetermined integration value or more, and the physical amount is an operation termination predetermined value or less in order to determine the excavation operation.

4. The working machine according to claim 3, wherein the controller is configured to determine that the excavation operation has been performed at a time the time integration value is the predetermined integration value or more, and a predetermined time has passed after the physical amount becomes the operation termination predetermined value or less in order to determine the excavation operation.

5. The working machine according to claim 2, wherein the controller is configured to reset the time integration value at a time a state where the physical amount is an integration start value or less has passed for a time integration value hold time after start of time integration in order to determine the excavation operation or the oil removal operation.

6. The working machine according to claim 1, wherein the operation lever is a pilot control lever or an electric lever, and the physical amount is a pilot pressure or an electrical signal.

7. The working machine according to claim 1, comprising:

an output configured to output the number of times of the excavating and loading work counted by the counting unit to a display device or an outside.

8. The working machine according to claim 1, comprising:

a setting changer configured to change various setting values.

9. A computer-implemented method of measuring a work amount of a working machine, the computer-implemented method comprising:

detecting a physical amount output according to an operation of an operation lever;

calculating a time integration value by performing time integration of the physical amount;

causing the time integration value and a predetermined operating angle of an excavating and loading mechanism associated with the operation of the operation lever to correspond to each other, and to determine that the operation of the operation lever has been performed, when the time integration value becomes a predetermined integration value or more; and counting, when a determined operation of the excavating and loading mechanism is performed in a predetermined order, number of times of excavating and loading work, treating the operation of the excavating and loading mechanism performed in the predetermined order, as one time, wherein the operation of the excavating and loading mechanism includes at least an excavating operation and a swing operation.

* * * * *